(12) United States Patent
Despres-Nadeau et al.

(10) Patent No.: US 9,981,519 B2
(45) Date of Patent: May 29, 2018

(54) REAR SUSPENSION ASSEMBLY FOR AN OFF-ROAD VEHICLE

(71) Applicant: BOMBARDIER RECREATIONAL PRODUCTS INC., Valcourt (CA)

(72) Inventors: Charles Despres-Nadeau, Sherbrooke (CA); Martin Heon, Sherbrooke (CA); Daniel Leclerc, St-Denis de Brompton (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 92 days.

(21) Appl. No.: 15/010,773

(22) Filed: Jan. 29, 2016

(65) Prior Publication Data

US 2016/0347137 A1    Dec. 1, 2016

Related U.S. Application Data

(60) Provisional application No. 62/109,375, filed on Jan. 29, 2015.

(51) Int. Cl.
| | |
|---|---|
| *B60G 3/20* | (2006.01) |
| *B62D 7/20* | (2006.01) |
| *B60G 7/00* | (2006.01) |
| *B60N 2/00* | (2006.01) |
| *B62D 23/00* | (2006.01) |

(52) U.S. Cl.
CPC ............... *B60G 3/202* (2013.01); *B60G 3/20* (2013.01); *B60G 7/005* (2013.01); *B60N 2/00* (2013.01); *B60G 2200/18* (2013.01); *B60G 2200/182* (2013.01); *B60G 2200/462* (2013.01); *B60G 2204/416* (2013.01); *B60G 2206/11* (2013.01); *B60G 2300/07* (2013.01); *B60G 2300/124* (2013.01); *B62D 23/005* (2013.01)

(58) Field of Classification Search
CPC ................... B60G 3/202; B60G 3/205; B60G 2200/1442; B62D 7/20
See application file for complete search history.

(56) References Cited

U.S. PATENT DOCUMENTS

| | | | | |
|---|---|---|---|---|
| 3,642,084 A | * | 2/1972 | Takahashi | B60G 3/205 180/257 |
| 4,157,840 A | * | 6/1979 | Kroniger | B60G 3/10 280/124.134 |
| 4,245,853 A | * | 1/1981 | Inoue | B60G 3/205 280/124.143 |

(Continued)

*Primary Examiner* — Barry Gooden, Jr.
(74) *Attorney, Agent, or Firm* — BCF LLP

(57) ABSTRACT

A vehicle has a frame, driver and passenger seats, two front and two rear suspension assemblies, two front and two rear wheels, and a motor operatively connected to the at least two wheels. Each rear suspension assembly has a trailing arm having a front end pivotally connected to the frame; a knuckle pivotally connected to a rear portion of the trailing arm; a lower link having a laterally outward end pivotally connected to the trailing arm and a laterally inward end pivotally connected to the frame; an upper link having a laterally outward end pivotally connected to the trailing arm and a laterally inward end pivotally connected to the frame; and a toe link having a laterally outward end pivotally connected to the knuckle and a laterally inward end pivotally connected to the frame.

15 Claims, 44 Drawing Sheets

(56) References Cited

U.S. PATENT DOCUMENTS

| | | | | |
|---|---|---|---|---|
| 4,511,160 A * | 4/1985 | Inoue | | B60G 3/202 |
| | | | | 280/124.143 |
| 4,545,602 A * | 10/1985 | Shibahata | | B60G 7/006 |
| | | | | 180/415 |
| 4,765,647 A * | 8/1988 | Kondo | | B60G 3/205 |
| | | | | 280/124.128 |
| 4,969,661 A | 11/1990 | Omura et al. | | |
| 4,986,567 A * | 1/1991 | Kubo | | B60G 3/22 |
| | | | | 280/124.131 |
| 4,989,894 A | 2/1991 | Winsor et al. | | |
| 5,005,857 A * | 4/1991 | Camuffo | | B60G 3/20 |
| | | | | 280/124.109 |
| 5,215,329 A | 6/1993 | Santo | | |
| 5,499,839 A * | 3/1996 | Wahl | | B60G 3/202 |
| | | | | 280/124.142 |
| 6,702,309 B2 | 3/2004 | Cho | | |
| 6,799,781 B2 | 10/2004 | Rasidescu et al. | | |
| 6,851,691 B2 | 2/2005 | Rasidescu et al. | | |
| 7,635,138 B2 | 12/2009 | Imre et al. | | |
| 7,654,544 B2 | 2/2010 | Lounsberry et al. | | |
| 7,784,805 B2 | 8/2010 | Morgan | | |
| 7,798,505 B2 | 9/2010 | Neag et al. | | |
| 7,837,203 B1 | 11/2010 | Schmidt et al. | | |
| 7,891,684 B1 | 2/2011 | Luttinen et al. | | |
| 8,328,212 B1 * | 12/2012 | Dundon | | B60G 3/20 |
| | | | | 280/124.128 |
| 8,517,135 B2 | 8/2013 | Schapf et al. | | |
| 8,727,057 B2 | 5/2014 | Park et al. | | |
| 8,746,719 B2 | 6/2014 | Safranski et al. | | |
| 8,764,039 B2 * | 7/2014 | Keller | | B60G 3/202 |
| | | | | 280/124.128 |
| 8,950,824 B2 | 2/2015 | Eck et al. | | |
| 9,180,801 B2 | 11/2015 | Kennedy | | |
| 9,211,924 B2 * | 12/2015 | Safranski | | B60G 3/14 |
| 9,365,251 B2 * | 6/2016 | Safranski | | B60G 3/14 |
| 9,855,806 B1 * | 1/2018 | Jo | | B60G 3/20 |
| 2003/0038444 A1 | 2/2003 | Chang | | |
| 2004/0046349 A1 * | 3/2004 | Ackley | | B60G 3/18 |
| | | | | 280/124.135 |
| 2004/0129489 A1 | 7/2004 | Brasseal et al. | | |
| 2004/0135338 A1 | 7/2004 | Asteggiano | | |
| 2005/0006868 A1 | 1/2005 | Ziech et al. | | |
| 2005/0073126 A1 | 4/2005 | Seki | | |
| 2005/0140110 A1 | 6/2005 | Lee et al. | | |
| 2005/0275183 A1 | 12/2005 | Amano | | |
| 2006/0091636 A1 | 5/2006 | Shelton | | |
| 2006/0237938 A1 | 10/2006 | Imre et al. | | |
| 2007/0007742 A1 | 1/2007 | Allen et al. | | |
| 2007/0096420 A1 | 5/2007 | Lounsberry et al. | | |
| 2007/0114747 A1 | 5/2007 | Morgan | | |
| 2007/0176386 A1 | 8/2007 | Schlangen et al. | | |
| 2008/0135320 A1 | 6/2008 | Matthies | | |
| 2008/0290623 A1 * | 11/2008 | Lundmark | | B60G 3/20 |
| | | | | 280/124.152 |
| 2011/0048833 A1 * | 3/2011 | Schapf | | B60G 3/20 |
| | | | | 180/233 |
| 2012/0031688 A1 | 2/2012 | Safranski et al. | | |
| 2012/0031693 A1 * | 2/2012 | Deckard | | F16H 57/0416 |
| | | | | 180/68.3 |
| 2013/0277937 A1 * | 10/2013 | Keller | | B60G 3/202 |
| | | | | 280/124.128 |
| 2014/0125025 A1 | 5/2014 | Lee et al. | | |
| 2014/0251712 A1 * | 9/2014 | Brady | | B62D 21/11 |
| | | | | 180/291 |
| 2014/0353937 A1 * | 12/2014 | | Girelli Consolaro | B60G 21/0551 |
| | | | | 280/124.128 |
| 2017/0274716 A1 * | 9/2017 | Chung | | B60G 3/20 |

\* cited by examiner

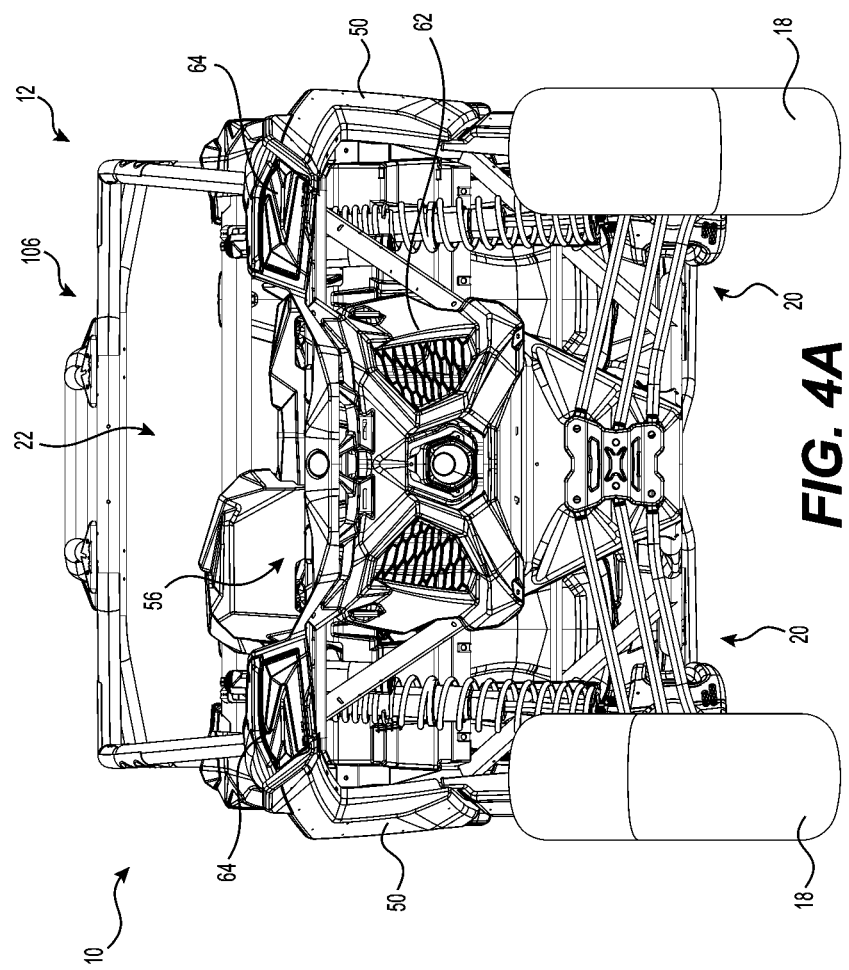

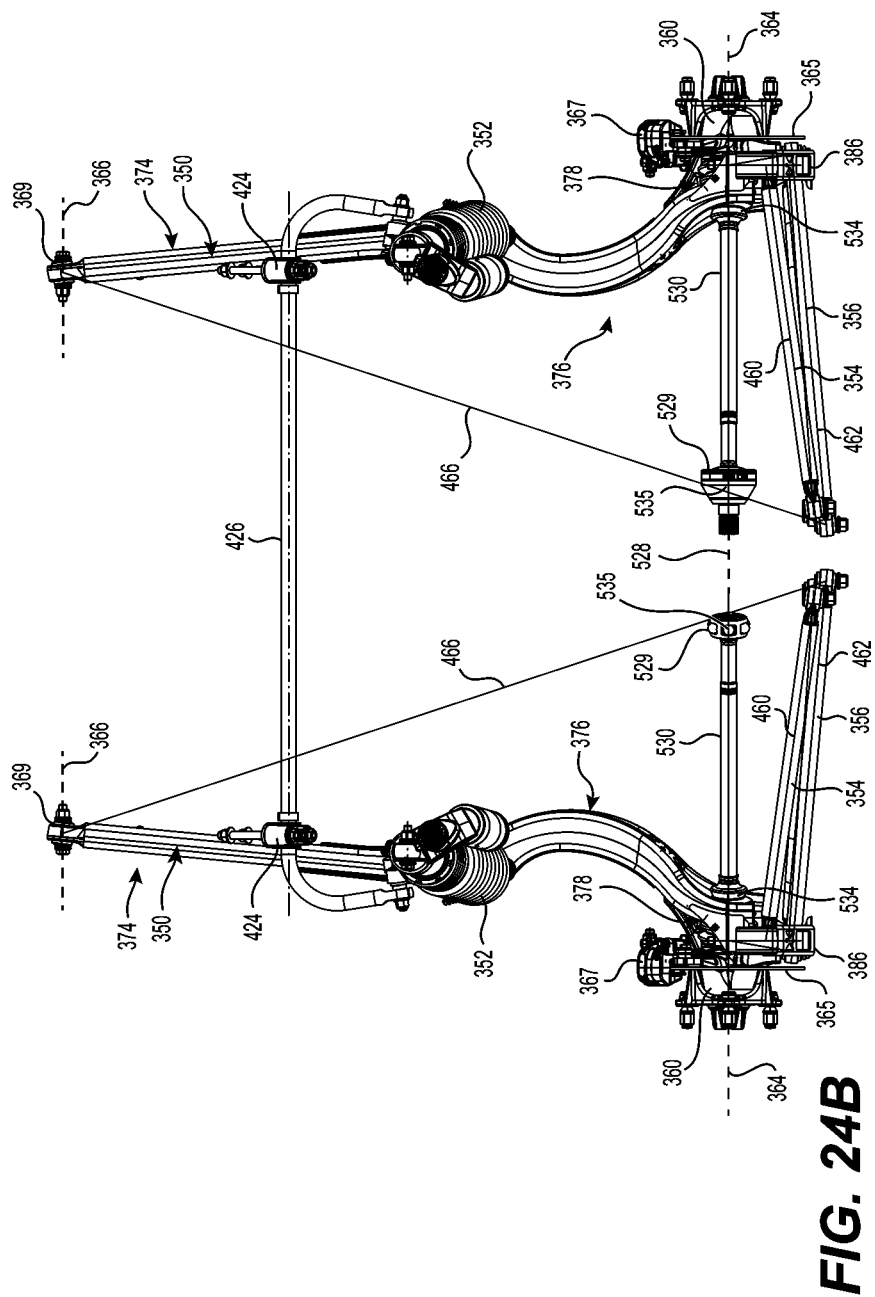

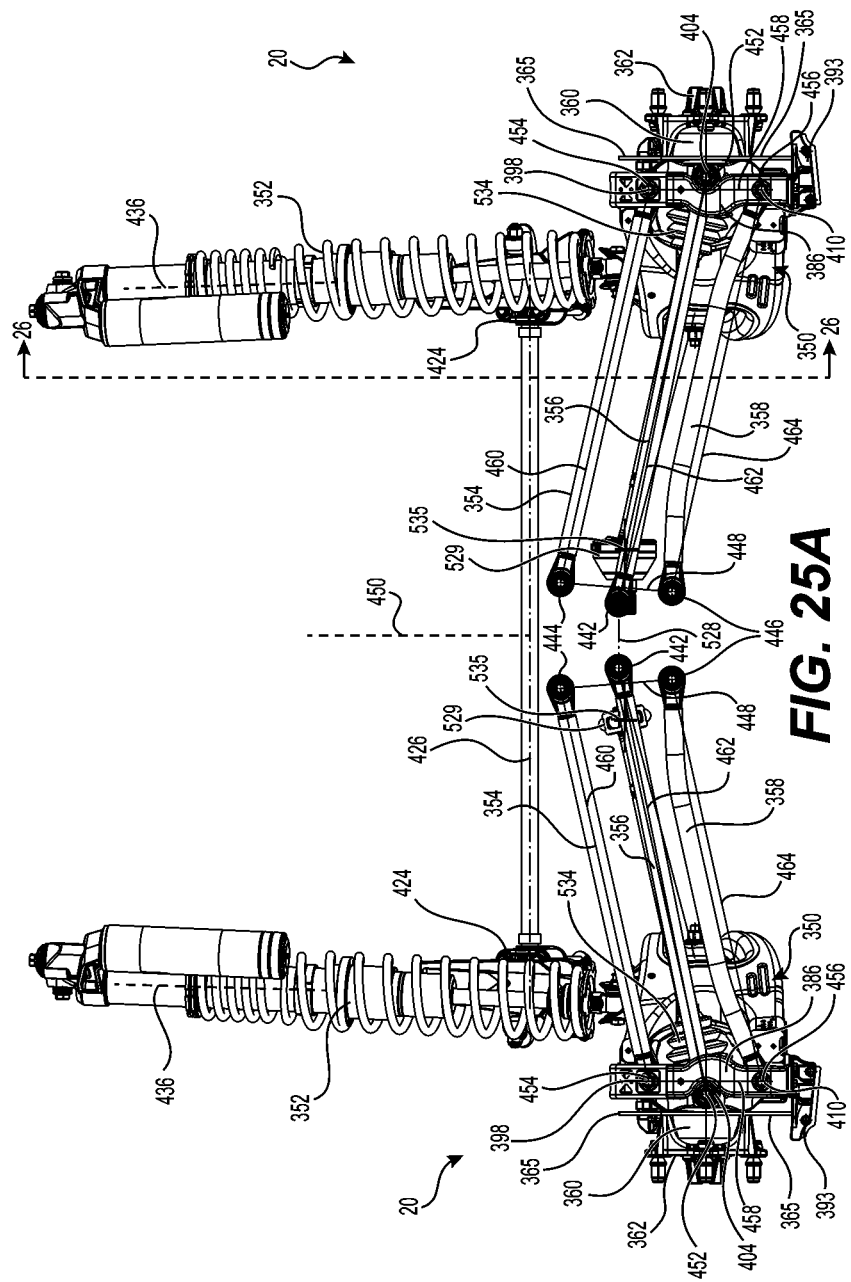

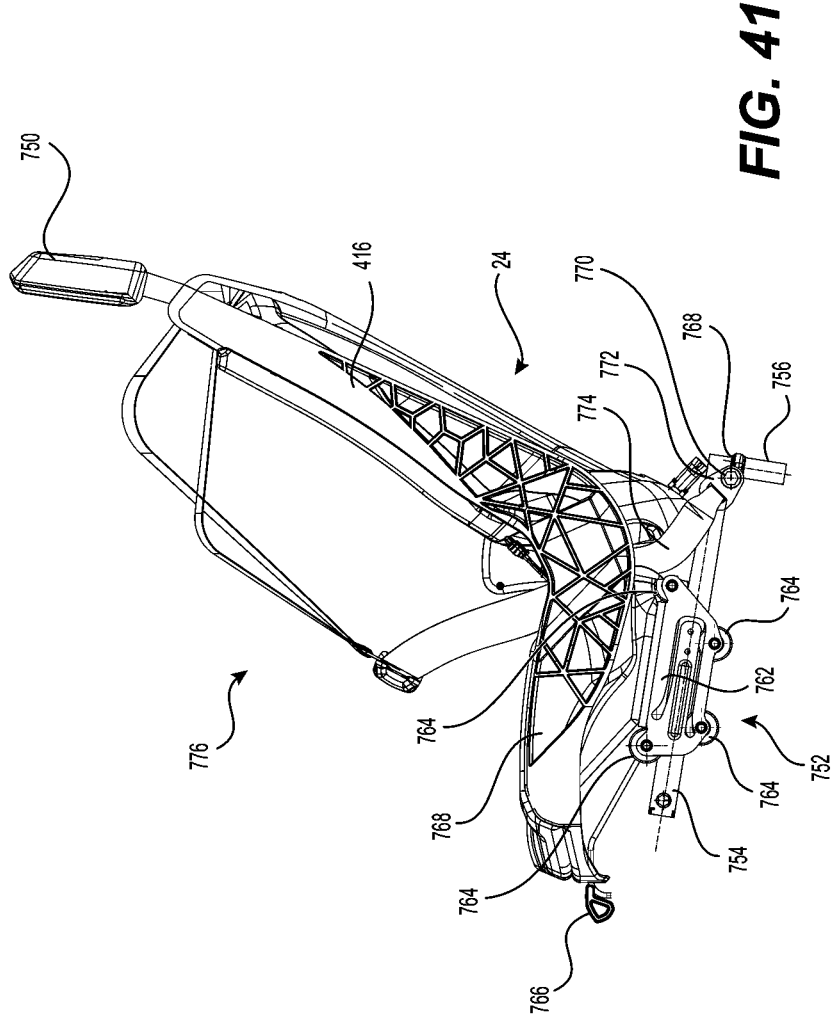

REAR SUSPENSION ASSEMBLY FOR AN OFF-ROAD VEHICLE

CROSS-REFERENCE

The present application claims priority to U.S. Provisional Patent Application No. 62/109,375, filed Jan. 29, 2015, the entirety of which is incorporated herein by reference.

FIELD OF TECHNOLOGY

The present technology relates to rear suspension assemblies for off-road vehicles.

BACKGROUND

There exist various types of vehicles used mainly in off-road conditions. One such type is the side-by-side off-road vehicle. The name "side-by-side" refers to the seating arrangement of the vehicle in which the driver and a passenger are seated side-by-side. Some side-by-side off-road vehicles also have a second row of seats to accommodate one or more additional passengers. These vehicles typically have an open cockpit, a roll cage and a steering wheel.

To be able to operate in off-road conditions, a side-by-side off-road vehicle needs to be able to handle bumpy terrain to operate on various surfaces including, but not limited to, sand, dirt and mud. These conditions represent unique challenges not typically encountered when designing on-road vehicles such as a car.

One such challenge is that the suspension assemblies need to have a large amount of travel to handle the bumpy terrain. However, as the wheels move up and down with the suspension assemblies, in addition to moving vertically, their orientation also changes. If this change of orientation is substantial, handling of the vehicle can be negatively affected.

Furthermore, side-by-side off-road vehicles are generally narrower and shorter than on-road vehicles such as cars.

Thus there is a desire for a suspension assembly suitable for the operating conditions and limited overall dimensions of side-by-side off-road vehicles.

SUMMARY

It is an object of the present technology to ameliorate at least some of the inconveniences present in the prior art.

According to one aspect of the present technology, there is provided a vehicle having: a frame; a driver seat connected to the frame; a passenger seat connected to the frame, the passenger seat being disposed beside the driver seat; a front left suspension assembly connected to the frame; a front left wheel operatively connected to the front left suspension assembly; a front right suspension assembly connected to the frame; a front right wheel operatively connected to the front right suspension assembly; a rear left suspension assembly connected to the frame; a rear left wheel operatively connected to the rear left suspension assembly; a rear right suspension assembly connected to the frame; a rear right wheel operatively connected to the rear right suspension assembly; a rear differential operatively connected to the rear left wheel and the rear right wheel, the rear differential defining a laterally extending rear differential axis; and a motor operatively connected to the rear differential, the motor driving the right rear wheel and the left rear wheel via the rear differential. Each of the rear left suspension assembly and the rear right suspension assembly has: a trailing arm having a front end pivotally connected to the frame; a knuckle pivotally connected to a rear portion of the trailing arm; a lower link having a laterally outward end pivotally connected to the trailing arm and a laterally inward end pivotally connected to the frame; an upper link having a laterally outward end pivotally connected to the trailing arm and a laterally inward end pivotally connected to the frame; and a toe link having a laterally outward end pivotally connected to the knuckle and a laterally inward end pivotally connected to the frame. The lower link, the upper link and the toe link being disposed completely behind the rear differential axis.

In some implementations of the present technology, a rear left hub rotationally connects the rear left wheel to the knuckle of the rear left suspension assembly; a left half-shaft operatively connects the rear left hub to the rear differential; a rear right hub rotationally connects the rear right wheel to the knuckle of the rear right suspension assembly; and a right half-shaft operatively connects the rear right hub to the rear differential. The lower links, the upper links and the toe links are disposed completely behind the left and right half-shafts.

In some implementations of the present technology, for each of the rear left suspension assembly and the rear right suspension assembly the toe link is vertically between the lower link and the upper link.

In some implementations of the present technology, each of the rear left suspension assembly and the rear right suspension assembly also has: an upper ball joint pivotally connecting the knuckle to the trailing arm, the upper ball joint being vertically higher than a wheel rotation axis of a corresponding one of the left rear wheel and the right rear wheel; and a lower ball joint pivotally connecting the knuckle to the trailing arm, the lower ball joint being vertically lower than the wheel rotation axis.

In some implementations of the present technology, for each of the rear left suspension assembly and the rear right suspension assembly: the lower link is parallel to the upper link when a line passing through a lower connection point and an upper connection point is vertical; the lower connection point is a connection point of the laterally outward end of the lower link with the trailing arm; and the upper connection point is a connection point of the laterally outward end of the upper link with the trailing arm.

In some implementations of the present technology, for each of the rear left suspension assembly and the rear right suspension assembly: a projection of a first line passing through connection points of the lower link with the trailing arm and the frame onto a horizontal plane is skewed relative to a projection of a second line passing through connection points of the toe link with the knuckle and the frame onto the horizontal plane; the projection of the second line is skewed relative to a projection of a third line passing through connection points of the upper link with the trailing arm and the frame onto the horizontal plane; and the projection of the third line is skewed relative to the projection of the first line.

In some implementations of the present technology, for each of the rear left suspension assembly and the rear right suspension assembly: a projection of a first line passing through connection points of the lower link with the trailing arm and the frame onto a laterally extending vertical plane is skewed relative to a projection of a second line passing through connection points of the toe link with the knuckle and the frame onto the vertical plane; and the projection of the second line is skewed relative to a projection of a third line passing through connection points of the upper link with the trailing arm and the frame onto the vertical plane.

In some implementations of the present technology, each of the rear left suspension assembly and the rear right suspension assembly also has a shock absorber assembly having a lower end pivotally connected to the trailing arm and an upper end pivotally connected to the frame.

In some implementations of the present technology, a torsion bar is pivotally connected between the trailing arms.

In some implementations of the present technology, for each of the rear left suspension assembly and the rear right suspension assembly a connection point of the laterally outward end of the toe link with the knuckle is laterally outward of connection points of the laterally outward ends of the upper and lower links with the trailing arm.

In some implementations of the present technology, for each of the rear left suspension assembly and the rear right suspension assembly a connection point of the laterally inward end of the toe link with the frame is laterally inward of connection points of the laterally inward ends of the upper and lower links with the frame.

In some implementations of the present technology, for each of the rear left suspension assembly and the rear right suspension assembly a connection point of the laterally outward end of the toe link with the knuckle is longitudinally rearward of connection points of the laterally outward ends of the upper and lower links with the trailing arm.

In some implementations of the present technology, a rear left hub rotationally connects the rear left wheel to the knuckle of the rear left suspension assembly; a rear left brake disk is connected to the rear left hub; a rear right hub rotationally connects the rear right wheel to the knuckle of the rear right suspension assembly; and a rear right brake disk is connected to the rear right hub. For each of the rear left suspension assembly and the rear right suspension assembly a line passing through connection points of the toe link with the knuckle and the frame extends through a circle defined by a perimeter of a corresponding one of the rear left and rear right brake disk.

In some implementations of the present technology, for each of the rear left suspension assembly and the rear right suspension assembly: the laterally outward end of the lower link is pivotally connected to the knuckle; and the laterally outward end of the upper link is pivotally connected to the knuckle.

In some implementations of the present technology, for each of the rear left suspension assembly and the rear right suspension assembly: the laterally outward end of the lower link is behind the knuckle; the laterally outward end of the upper link is behind the knuckle; and the laterally outward end of the toe link is behind the knuckle.

According to another aspect of the present technology, there is provided a vehicle having: a frame; a driver seat connected to the frame; a passenger seat connected to the frame, the passenger seat being disposed beside the driver seat; a front left suspension assembly connected to the frame; a front left wheel operatively connected to the front left suspension assembly; a front right suspension assembly connected to the frame; a front right wheel operatively connected to the front right suspension assembly; a rear left suspension assembly connected to the frame; a rear left wheel operatively connected to the rear left suspension assembly; a rear right suspension assembly connected to the frame; a rear right wheel operatively connected to the rear right suspension assembly; and a motor operatively connected to at least two of the wheels. Each of the rear left suspension assembly and the rear right suspension assembly comprising: a trailing arm having a front end pivotally connected to the frame; a knuckle pivotally connected to a rear portion of the trailing arm; a link having a laterally outward end pivotally connected to the trailing arm and the knuckle and a laterally inward end pivotally connected to the frame; and a fastener fastening the laterally outward end of the link, the knuckle and the trailing arm together.

In some implementations of the present technology, for each of the rear left suspension assembly and the rear right suspension assembly: the link is a lower link; and the fastener is a lower fastener. Each of the rear left suspension assembly and the rear right suspension assembly also has: an upper link having a laterally outward end pivotally connected to the trailing arm and the knuckle and a laterally inward end pivotally connected to the frame; and an upper fastener fastening the laterally outward end of the upper link, the knuckle and the trailing arm together.

In some implementations of the present technology, for each of the rear left suspension assembly and the rear right suspension assembly: the laterally outward end of the lower link is pivotally connected to the trailing arm and the knuckle via a first ball joint; and the laterally outward end of the upper link is pivotally connected to the trailing arm and the knuckle via a second ball joint.

In some implementations of the present technology, for each of the rear left suspension assembly and the rear right suspension assembly: the knuckle has an upper tab and a lower tab; the upper fastener passes through the upper tab; and the lower fastener passes through the lower tab.

In some implementations of the present technology, for each of the rear left suspension assembly and the rear right suspension assembly: the upper tab is longitudinally between the laterally outward end of the upper link and the trailing arm; and the lower tab is longitudinally between the laterally outward end of the lower link and the trailing arm.

In some implementations of the present technology, each of the rear left suspension assembly and the rear right suspension assembly also has: an upper ball joint disposed in the upper tab; and a lower ball joint disposed in the lower tab. The upper fastener passes through the upper ball joint; and the lower fastener passes through the lower joint.

In some implementations of the present technology, each of the rear left suspension assembly and the rear right suspension assembly also has a toe link having a laterally outward end pivotally connected to the knuckle by a toe link fastener and a laterally inward end pivotally connected to the frame.

In some implementations of the present technology, for each of the rear left suspension assembly and the rear right suspension assembly the toe link is vertically between the lower link and the upper link.

In some implementations of the present technology, for each of the rear left suspension assembly and the rear right suspension assembly the toe link fastener is laterally outward of the lower and upper fasteners.

In some implementations of the present technology, for each of the rear left suspension assembly and the rear right suspension assembly a connection point of the laterally inward end of the toe link with the frame is laterally inward of connection points of the laterally inward ends of the upper and lower links with the frame.

In some implementations of the present technology, for each of the rear left suspension assembly and the rear right suspension assembly the laterally outward end of the toe link is longitudinally rearward the laterally outward ends of the upper and lower links.

In some implementations of the present technology, each of the rear left suspension assembly and the rear right suspension assembly also has a shock absorber assembly having a lower end pivotally connected to the trailing arm and an upper end pivotally connected to the frame.

In some implementations of the present technology, a torsion bar is pivotally connected between the trailing arms.

According to another aspect of the present technology, there is provided a vehicle having: a frame; a driver seat connected to the frame; a passenger seat connected to the frame, the passenger seat being disposed beside the driver seat; a front left suspension assembly connected to the frame; a front left wheel operatively connected to the front left suspension assembly; a front right suspension assembly connected to the frame; a front right wheel operatively connected to the front right suspension assembly; a rear left suspension assembly connected to the frame; a rear left wheel operatively connected to the rear left suspension assembly; a rear right suspension assembly connected to the frame; a rear right wheel operatively connected to the rear right suspension assembly; and a motor operatively connected to at least two of the wheels. Each of the rear left suspension assembly and the rear right suspension assembly has: a trailing arm having a front end pivotally connected to the frame; a knuckle pivotally connected to a rear portion of the trailing arm; a lower link having a laterally outward end pivotally connected to the trailing arm at a first connection point and a laterally inward end pivotally connected to the frame at a second connection point; an upper link having a laterally outward end pivotally connected to the trailing arm at a third connection point and a laterally inward end pivotally connected to the frame at a fourth connection point; and a toe link having a laterally outward end pivotally connected to the knuckle at a fifth connection point and a laterally inward end pivotally connected to the frame at a sixth connection point. The fifth connection point is laterally further from a longitudinally and vertically extending center plane than the first and third connection points.

In some implementations of the present technology, for each of the rear left suspension assembly and the rear right suspension assembly the sixth connection point is laterally closer to the plane than the second and fourth connection points.

In some implementations of the present technology, for each of the rear left suspension assembly and the rear right suspension assembly the sixth connection point is laterally between the plane and a line passing through the second and fourth connection points.

In some implementations of the present technology, for each of the rear left suspension assembly and the rear right suspension assembly the line is skewed relative to the plane.

In some implementations of the present technology, for each of the rear left suspension assembly and the rear right suspension assembly a line passing through the first and third connection points is laterally between the plane and the first connection point.

In some implementations of the present technology, for each of the rear left suspension assembly and the rear right suspension assembly the line is skewed relative to the plane.

In some implementations of the present technology, a rear left hub rotationally connects the rear left wheel to the knuckle of the rear left suspension assembly; a rear left brake disk is connected to the rear left hub; a rear right hub rotationally connects the rear right wheel to the knuckle of the rear right suspension assembly; and a rear right brake disk connected to the rear right hub. For each of the rear left suspension assembly and the rear right suspension assembly the fifth connection point is laterally between a line passing through the first and third connection points and a corresponding one of the rear left and rear right brake disk.

In some implementations of the present technology, a rear left hub rotationally connects the rear left wheel to the knuckle of the rear left suspension assembly; a rear left brake disk is connected to the rear left hub; a rear right hub rotationally connects the rear right wheel to the knuckle of the rear right suspension assembly; and a rear right brake disk is connected to the rear right hub. For each of the rear left suspension assembly and the rear right suspension assembly a line passing through the fifth and sixth connection points extends through a circle defined by a perimeter of a corresponding one of the rear left and rear right brake disk.

In some implementations of the present technology, for each of the rear left suspension assembly and the rear right suspension assembly the toe link is vertically between the lower link and the upper link.

In some implementations of the present technology, each of the rear left suspension assembly and the rear right suspension assembly has an instant center axis passing through the sixth connection point and a connection between the trailing arm and the frame. A rear differential operatively connects to the motor; a left constant velocity joint operatively connects to the rear differential; a left half-shaft operatively connects the left constant velocity joint to the rear left wheel; a right constant velocity joint operatively connects to the rear differential; and a right half-shaft operatively connects the right constant velocity joint to the rear right wheel.

In some implementations of the present technology, centers of the left and right velocity joints are in proximity to their corresponding center instant axes.

In some implementations of the present technology, centers of the left and right velocity joints are above their corresponding center instant axes when viewed in a rear elevation view of the vehicle.

In some implementations of the present technology, centers of the left and right velocity joints are laterally outward of their corresponding center instant axes when viewed in a top plan view of the vehicle.

In some implementations of the present technology, centers of the left and right velocity joints are vertically lower than the fourth connection points.

In some implementations of the present technology, centers of the left and right velocity joints are vertically lower than the sixth connection points.

In some implementations of the present technology, centers of the left and right velocity joints are vertically higher than the second connection points.

In some implementations of the present technology, the second, fourth and sixth connection points are laterally between centers of the left and right velocity joints.

In some implementations of the present technology, each of the rear left suspension assembly and the rear right suspension assembly also has: an upper ball joint pivotally connecting the knuckle to the trailing arm, the upper ball joint being vertically higher than a wheel rotation axis of a corresponding one of the left rear wheel and the right rear wheel; and a lower ball joint pivotally connecting the knuckle to the trailing arm, the lower ball joint being vertically lower than the wheel rotation axis.

In some implementations of the present technology, each of the rear left suspension assembly and the rear right suspension assembly also has a shock absorber assembly having a lower end pivotally connected to the trailing arm and an upper end pivotally connected to the frame.

In some implementations of the present technology, a torsion bar is pivotally connected between the trailing arms.

For purposes of this application, terms related to spatial orientation such as forwardly, rearwardly, upwardly, downwardly, left, and right, are as they would normally be understood by a driver of the vehicle sitting thereon in a normal riding position. Terms related to spatial orientation when describing or referring to components or sub-assemblies of the vehicle, separately from the vehicle should be understood as they would be understood when these components or sub-assemblies are mounted to the vehicle, unless specified otherwise in this application.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 4A is a rear elevation view thereof;

FIG. 24B is a top plan view of the rear suspension assemblies of the vehicle of FIG. 24A;

FIG. 25A is a rear elevation view of the rear suspension assemblies of FIG. 24A;

FIG. 41 is a left side elevation view of the driver seat of FIG. 39 with the seat moved forwardly.

DETAILED DESCRIPTION

Figure 1:
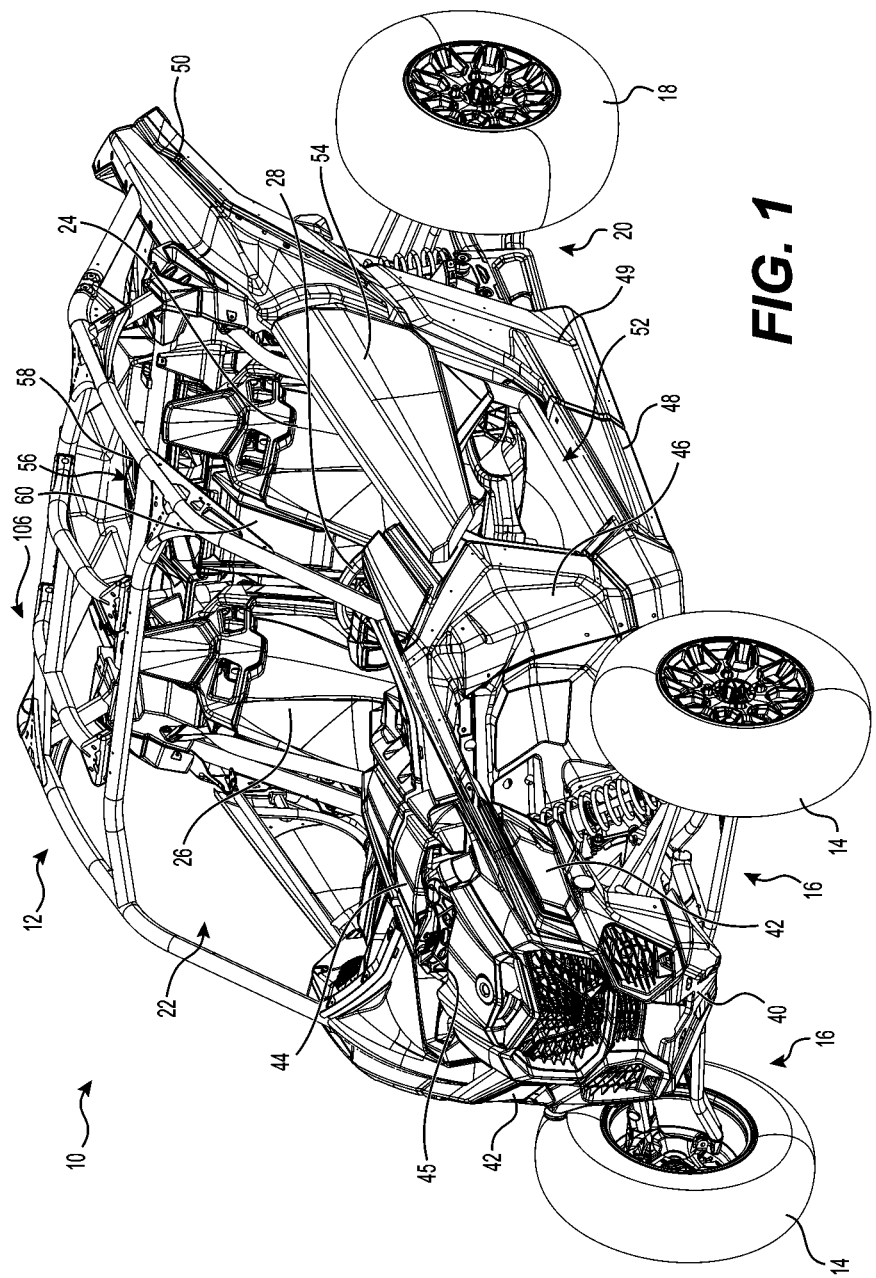
FIG. 1 is a perspective view of an off-road vehicle taken from a front, left side.

The present technology will be described with respect to a four-wheel off-road vehicle 10 having two side-by-side seats and a steering wheel. However, it is contemplated that some aspects of the present technology may apply to other types of vehicles such as, but not limited to, off-road vehicles having a handlebar and a straddle seat (i.e. an all-terrain vehicle (ATV)) and off-road vehicles having more or less than four wheels.

The general features of the off-road vehicle 10 will be described with respect to FIGS. 1 to 5. The vehicle 10 has a frame 12, two front wheels 14 connected to a front of the frame 12 by front suspension assemblies 16 and two rear wheels 18 connected to the frame 12 by rear suspension assemblies 20.

The frame 12 defines a central cockpit area 22 inside which are disposed a driver seat 24 and a passenger seat 26. In the present implementation, the driver seat 24 is disposed on the left side of the vehicle 10 and the passenger seat 26 is disposed on the right side of the vehicle 10. However, it is contemplated that the driver seat 24 could be disposed on the right side of the vehicle 10 and that the passenger seat 26 could be disposed on the left side of the vehicle 10. A steering wheel 28 is disposed in front of the driver seat 24. The steering wheel 28 is used to turn the front wheels 14 to steer the vehicle 10. Various displays and gauges 29 are disposed above the steering wheel 28 to provide information to the driver regarding the operating conditions of the vehicle 10. Examples of displays and gauges 29 include, but are not limited to, a speedometer, a tachometer, a fuel gauge, a transmission position display, and an oil temperature gauge.

Figure 5:
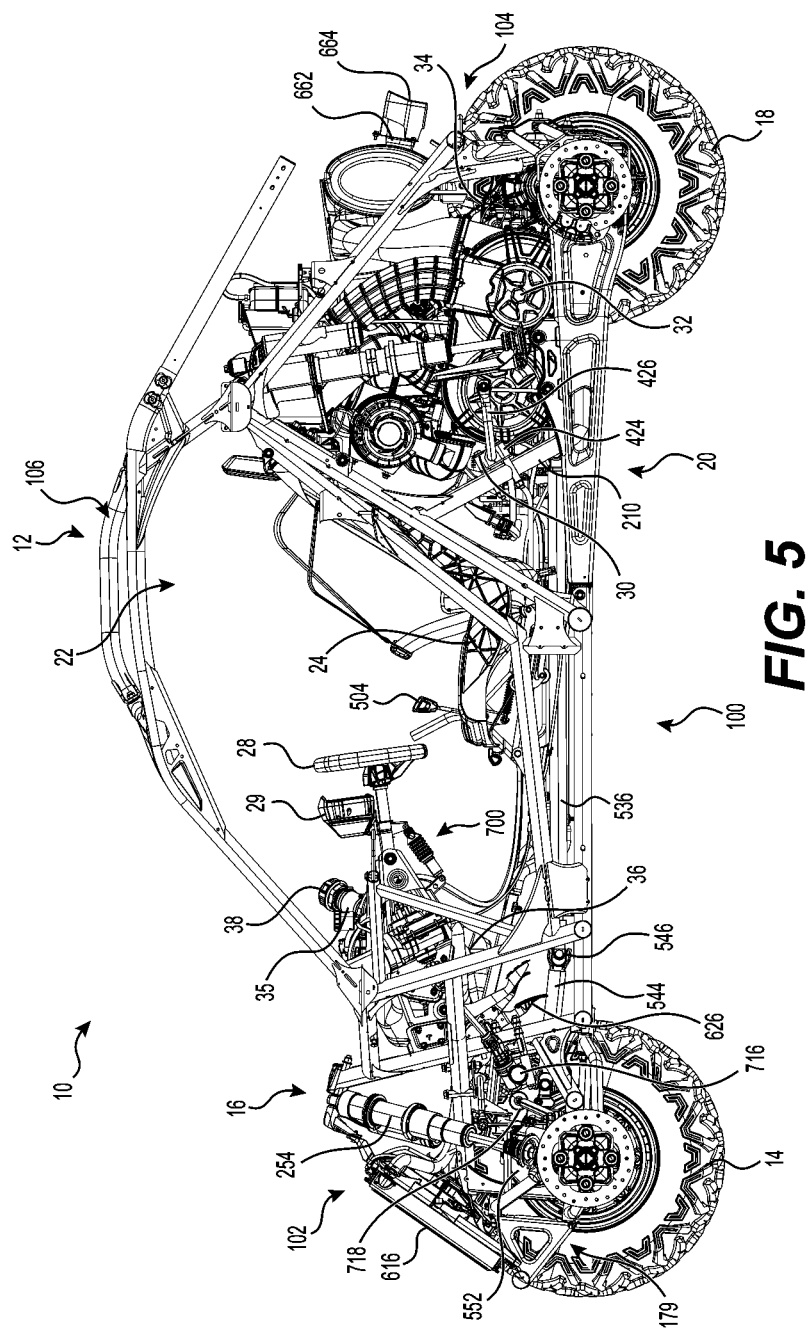
FIG. 5 is a left side elevation view thereof with body panels and the left wheels removed.
Figure 35:
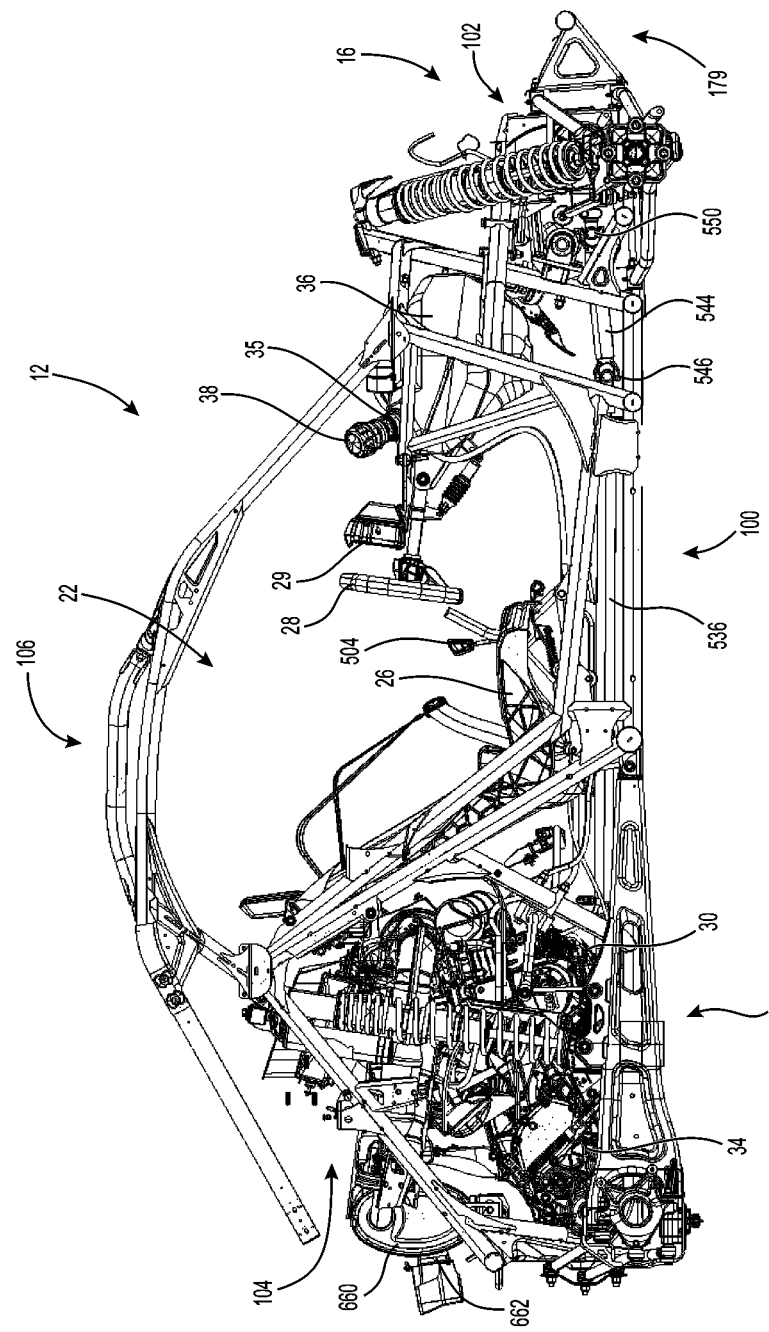
FIG. 35 is a right side elevation view of the components of FIG. 31 disposed in the frame of the vehicle of FIG. 1 with the seats, the suspension assembly, the steering assembly and the remainder of the powertrain.

As can be seen in FIG. 5, an engine 30 is connected to the frame 12 in a rear portion of the vehicle 10. The engine 30 is connected to a continuously variable transmission (CVT) 32 disposed on a left side of the engine 30. The CVT 32 is operatively connected to a transaxle 34 to transmit torque from the engine 30 to the transaxle 34. The transaxle 34 is disposed behind the engine 30. The transaxle 34 is operatively connected to the front and rear wheels 14, 18 to propel the vehicle 10. A powertrain of the vehicle 10 will be described in greater detail below. A fuel tank 36 is suspended from the frame 12 in front of the driver seat 26 as best seen in FIG. 35. The fuel tank 36 is disposed above the floor of the cockpit area 22 to the right of a longitudinal centerline 37 (shown in FIG. 28) of the vehicle 10. A filler neck 35 that is selectively closed by a cap 38 extends upward, rightward and rearward from a top, right and rear portion of the fuel tank 36. A fuel pump (not shown) is inserted through a top of the fuel tank 36.

Figure 2:
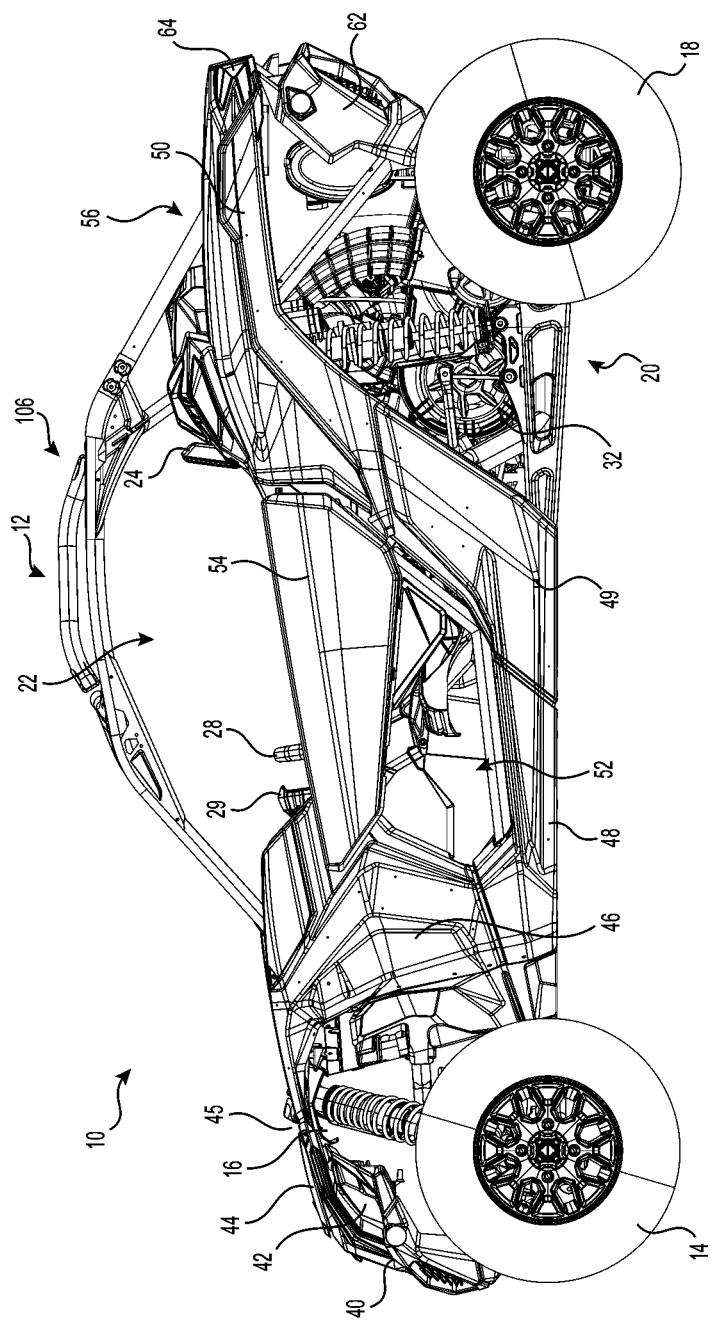
FIG. 2 is a left side elevation view thereof.
Figure 3:
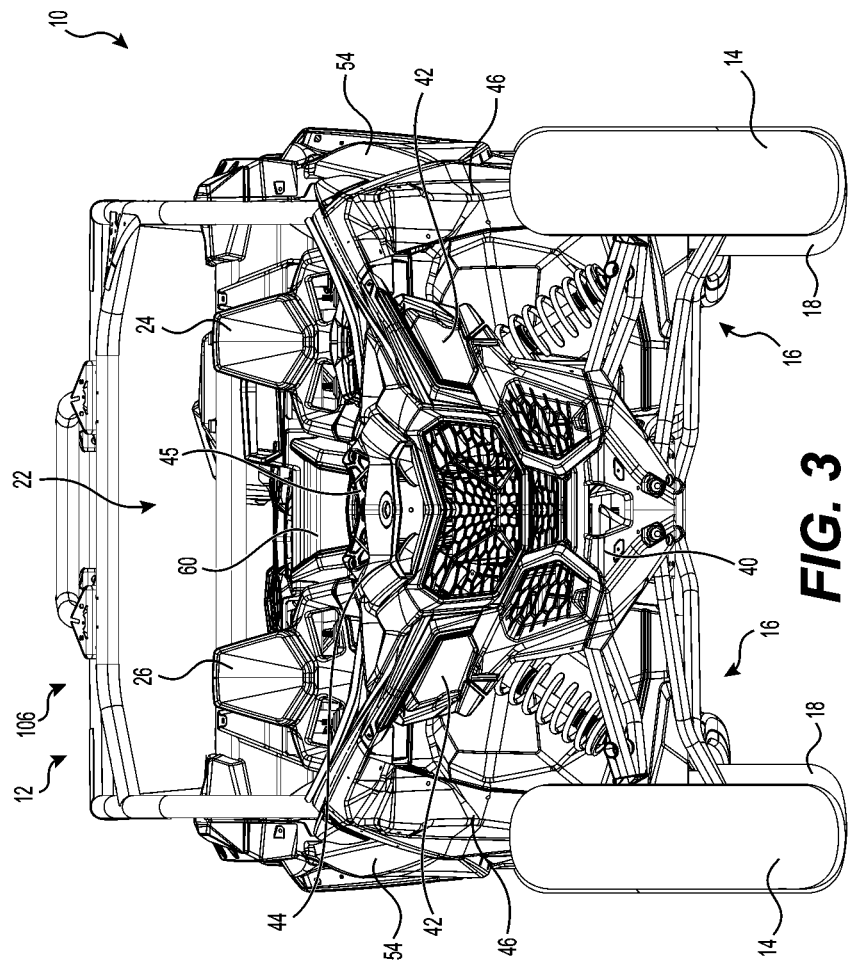
FIG. 3 is a front elevation view thereof.

Turning back to FIGS. 1 to 4B, body panels of the vehicle 10 will be described. The body panels are connected to the frame 12. The panels help protect the internal components of the vehicle 10 and provide some of the aesthetic features of the vehicle 10. Front panels 40 are connected to a front of the frame 12. The front panels 40 are disposed forward of the front suspension assemblies 16 and laterally between the front wheels 14. The front panels 40 define two apertures inside which the headlights 42 of the vehicle 10 are disposed. A cover 44 extends generally horizontally reward from a top of the front panels 40. The cover 44 defines an aperture 45 through which tops of the front suspension assemblies 16 protrude as will be described in greater detail below. Front fenders 46 are disposed rearward of the front panels 40 on each side of the vehicle 10. Each front fender 46 is disposed in part above and in part behind of its corresponding front wheel 14. Lower panels 48 extend along the bottom of the frame 12 between the front and rear wheels 14, 18. As can be seen in FIG. 2 for the left lower panel 48, each lower panel 48 has a front end disposed under the bottom portion of its corresponding front fender 46 and extends rearward therefrom. A generally L-shaped panel 49 is disposed behind the rear end of each lower panel 48. Generally L-shaped rear fenders 50 extend upward and then rearward from the rear, upper ends of the L-shaped panels 49. Each rear fender 50 is disposed in part above and in part forward of its corresponding rear wheel 18. The rear fenders 50 define apertures at the rear thereof to receive the brake lights 64 of the vehicle 10. It is contemplated that the brake lights 64 could be replaced with reflectors or that reflectors could be provided in addition to the brake lights 64.

On each side of the vehicle 10, the front fender 46, the lower panel 48, the L-shaped panel 49 and the rear fender 50 define a passage 52 through which a driver (or passenger depending on the side of the vehicle 10) can enter or exit the vehicle 10. Each side of the vehicle 10 is provided with a door 54 that selectively closes an upper portion of the corresponding passage 52. Each door 54 is hinged at a rear thereof to its corresponding rear fender 50 and associated portion of the frame 12 and is selectively connected at a front thereof to its corresponding front fender 46 via a releasable latch (not shown). It is contemplated that each door 54 could be hinged at a front thereof and latched at a rear thereof. As best seen in FIG. 2 for the left side of the vehicle 10, when the doors 52 are closed the lower portions of the passages 52 are still opened. It is contemplated that nets could extend in the lower portions of the passages 52 when the doors 54 are closed or that the doors 54 could be larger so as to close the lower portions of the passages 52.

Figure 4B:
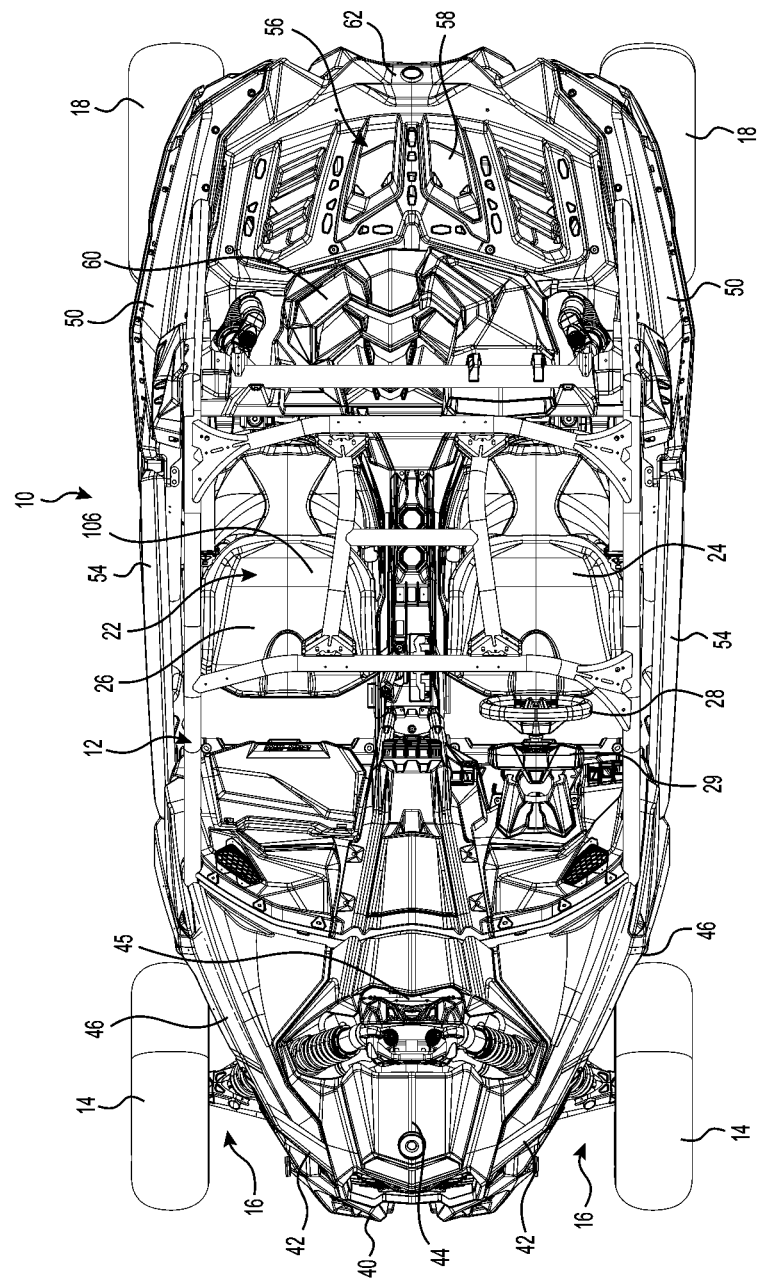
FIG. 4B is a top plan view thereof.

As best seen in FIG. 4B, the rear fenders 50 define a cargo space 56 therebetween behind the seats 24, 26. The cargo space 56 has a floor 58 extending horizontally between the rear fenders 50. The floor 58 has a plurality of apertures such that the floor 58 can act as an attachments base to receive anchors such as those described in U.S. Pat. No. 8,875,830, issued Nov. 4, 2014, the entirety of which is incorporated herein by reference, in order to secure various items in the cargo space 56. It is contemplated that hooks or loops could be provided instead of or in addition to the apertures in the floor 58. It is also contemplated that the floor 58 could not be provided with any attachment features. It is contemplated that the floor 58 could be replaced by a cargo box that can be tilted in order to dump its content. A separation panel 60 extends laterally and is disposed longitudinally between the seats 24, 26 and the floor 58. As a result, the separation panel 60 separates the cockpit area 22 from the cargo area 56. As best seen in FIGS. 4A and 4B, rear panels 62 are disposed laterally between the rear wheels 18 behind the floor 58.

Turning now to FIGS. 6 to 15, the frame 12 of the vehicle 10 will be described in more detail. The frame 12 has a central portion 100, a front portion 102 and a rear portion 104. As their names suggest, the front portion 102 is disposed in front of the central portion 100 and the rear portion 104 is disposed behind the central portion 100. The central portion 100 defines the cockpit area 22 in which the seats 24, 26 are disposed. The central portion 100 also defines a roll cage 106. The front suspension assemblies 16 are connected to the central and front portions 100, 102 of the frame 12 as will be described in greater detail below. The engine 30, the CVT 32 and the transaxle 34 are supported by the rear portion 104 of the frame 12 as will be described in greater detail below. The rear suspension assemblies 20 are connected to the central and rear portions 100, 104 of the frame 12 as will be described in greater detail below. The frame 12 is made from a plurality of hollow cylindrical steel members and steel brackets that are welded to each other. It is contemplated that at least some of the hollow cylindrical members could be replaced by other types of members such as solid cylindrical members, hollow tubes having a cross-section other than circular, and beams, for example. It is also contemplated that the members and brackets could be made of another type of metal, such as aluminum for example. It is also contemplated that at least some of the members and brackets could be made of a non-metallic material, such as composite materials or plastics for example. It is also contemplated that at least some of the members and brackets could be joined to each other by means other than welding, such as by fastening and bonding for example. It is also contemplated that two or more of the members and brackets described below could be cast or otherwise formed as a single component. It is also contemplated that the frame 12 could have more or less members and brackets than described below depending on the type of materials used, the required strength and rigidity of the frame 12 and the weight of the components attached to the frame 12 for example.

Figure 36:
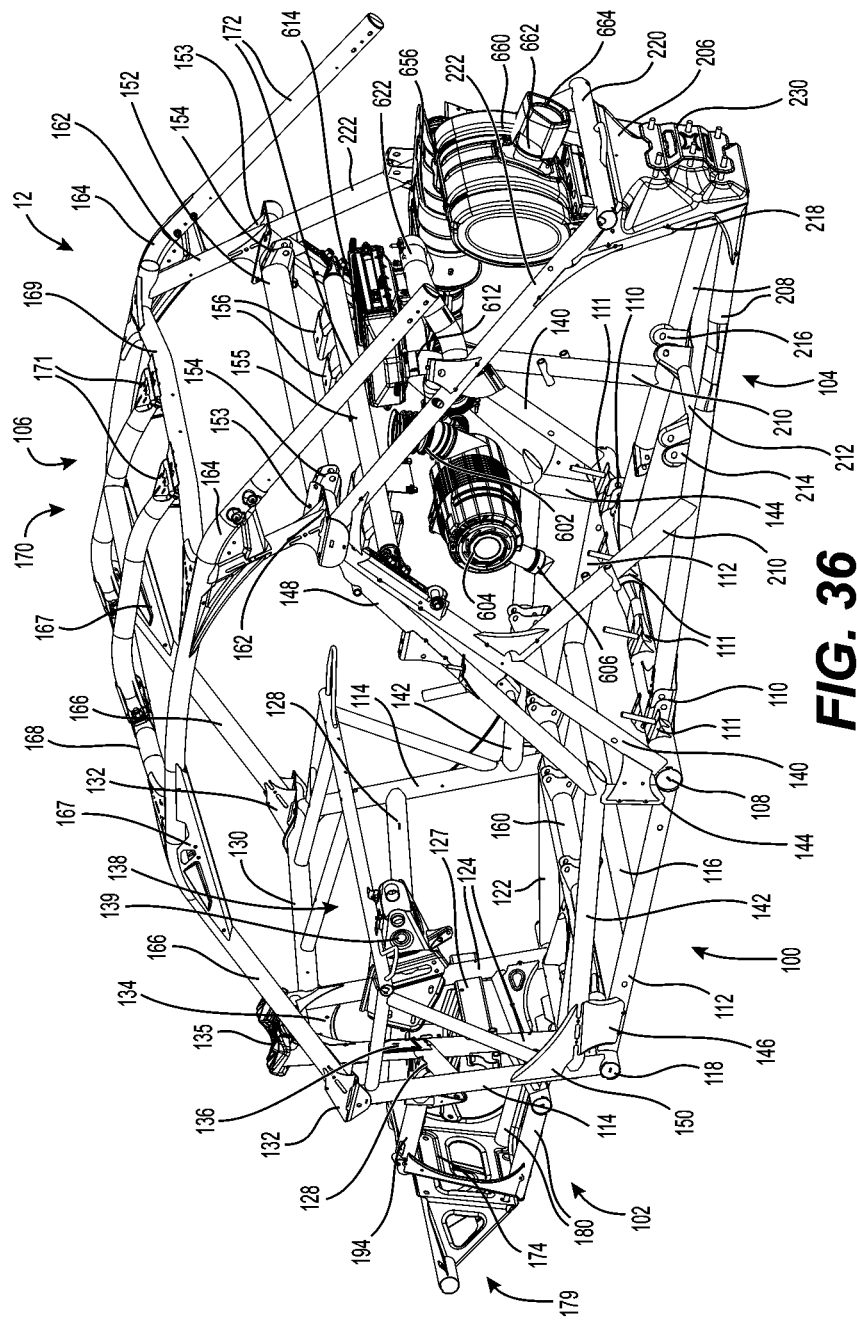
FIG. 36 is a perspective view taken from a rear, left side of the air intake system, the exhaust system and the frame of the vehicle of FIG. 1.
Figure 37:
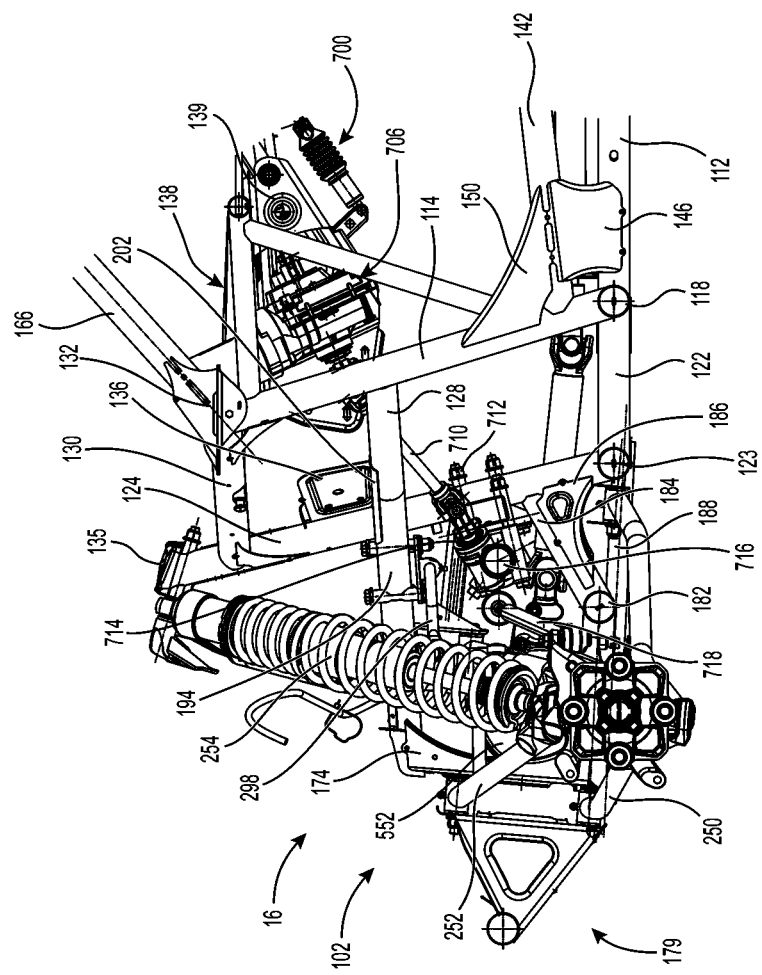
FIG. 37 is a left side elevation view of a front of the frame, the front suspension assemblies and the steering assembly of the vehicle of FIG. 1.
Figure 38:
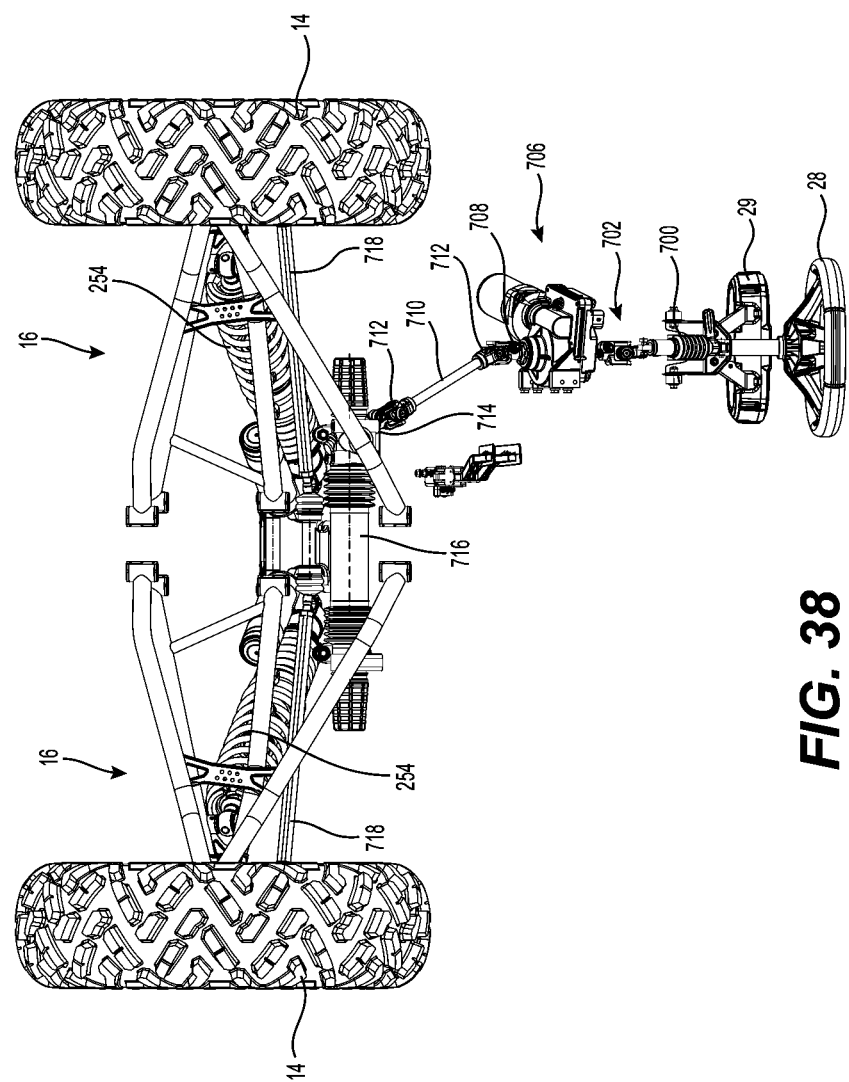
FIG. 38 is a bottom plan view of the front wheels, the front suspension assemblies and the steering assembly of the vehicle of FIG. 1.

The central portion 100 of the frame 12 will now be described in greater detail with reference to FIGS. 7 to 9 and 36. The central portion 100 has a laterally extending bottom member 108. Brackets 110, 111, best seen in FIG. 36, are connected to the rear of the bottom member 108 and extend rearward from the member 108. The brackets 110, 111 are disposed laterally inward of the ends of the bottom member 108. The brackets 110 are used to connect the rear suspension assemblies 20 as will be described in greater detail below. The brackets 111 are used to connect the rear of the seats 24, 26. Two bottom members 112 are connected at their rear ends to the ends of the bottom member 108. From the bottom member 108, the bottom members 112 extend forward and laterally inward. A laterally extending bottom member 116 is connected to and extends between the two bottom members 112. The bottom member 116 is disposed forward of the bottom member 108. The front ends of the bottom members 112 are connected to the rear of a laterally extending bottom member 118. The bottom member 118 is disposed forward of the bottom member 116. A bracket 120 is connected to the bottom member 118. The bracket 120 supports a portion of the powertrain of the vehicle 10 as will be discussed in greater detail below. Generally vertical members 114 extend upward from the ends of the laterally extending member 118. Diagonal members 122 extend forward and laterally inward from the ends of the laterally extending member 118 and connect at their front ends to a laterally extending member 123. The members 108, 112, 114, 116, 118, 122 and 123 are straight.

Figure 8:
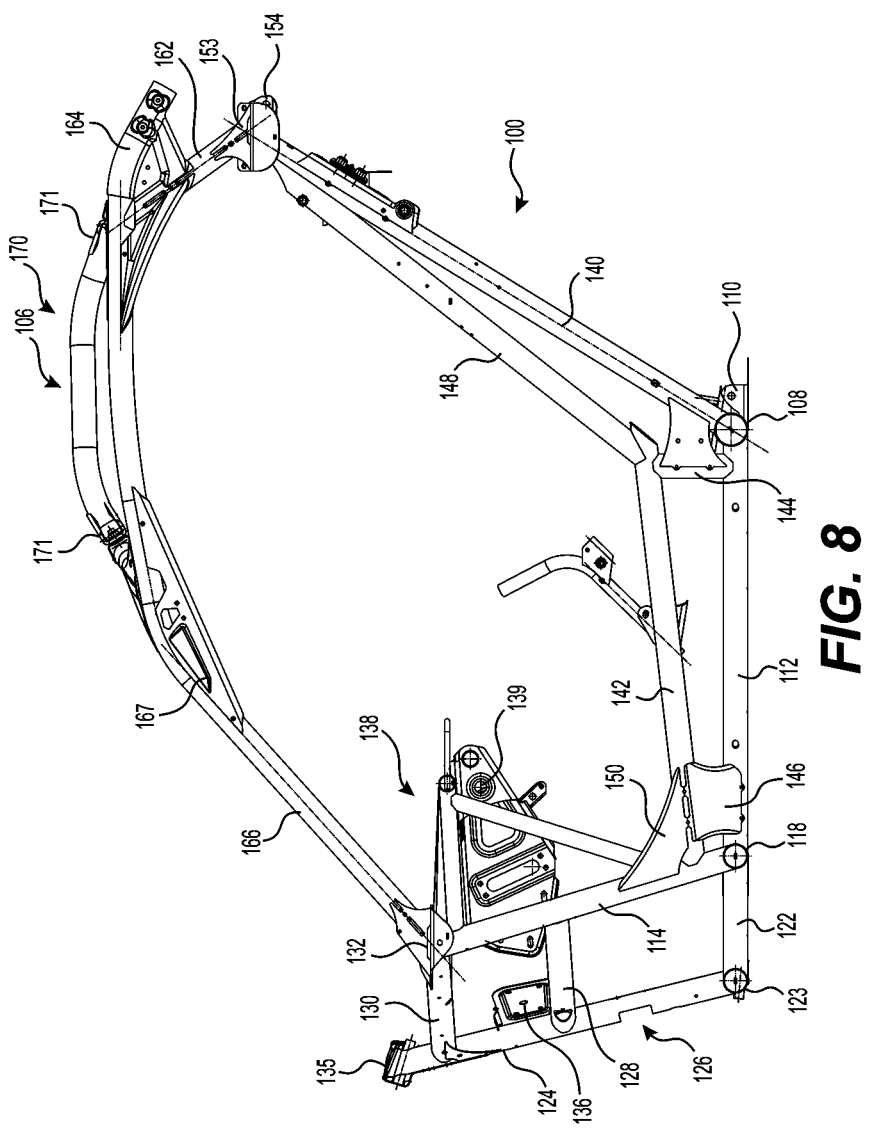
FIG. 8 is a left side elevation view of the central portion of the frame of FIG. 7.

From their bottom ends, the generally vertical members 114 extend upward, forward and laterally inward. Two other generally vertical members 124 are connected at their bottom ends to the top of the laterally extending bottom member 123. From their bottom ends, the generally vertical members 124 extend upward, forward and laterally inward. As can be seen in FIG. 8, the generally vertical members 124 are disposed forward of the generally vertical members 114. As can also be seen in FIG. 8, the top ends of the generally vertical members 124 are vertically higher than the top ends of the generally vertical members 114. Each generally vertical member 124 has a notch 126 in a front thereof. A rectangular hollow member 127 (see FIGS. 6, 17 and 36) is received in the notches 126 and is connected to the vertical members 114. For each pair of a generally vertical member 114 and its corresponding generally vertical member 124, straight horizontal members 128 and 130 are connected to and extend between the generally vertical members 114,124. As can be seen, the horizontal members 128 are disposed vertically higher than the notches 126. The horizontal members 130 are disposed vertically higher than the horizontal members 128. The horizontal members 130 are connected to the top ends of the generally vertical members 114 and below the top ends of the generally vertical members 124. Brackets 132 are connected to the top of notches formed in the laterally outer ends of the members 130. A bracket 134 is connected to and extends between the generally vertical members 124. Another bracket 135 is connected to the top ends of the vertical members 124. The members 114, 122, 123, 124, 128 and 130 and the bracket 134 form a barrier at a front of the cockpit area 22. A plate 136 is connected to a top of the left horizontal member 128 and to the left of the left generally vertical member 124. The plate 136 is used to connect various components of the braking system to the frame 12, such as the master cylinder (not shown).

Figure 17:
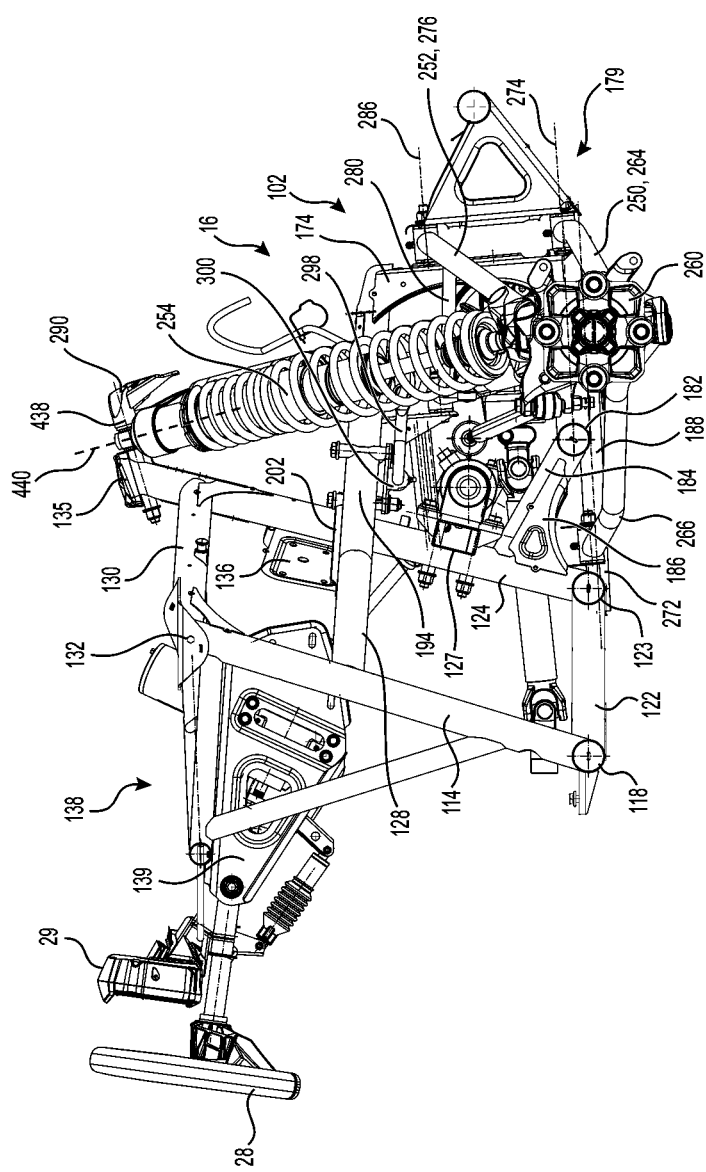
FIG. 17 is a right side elevation view of the components of FIG. 16.

A support frame structure 138 is disposed behind and is connected to the barrier formed by the members 114, 122, 123, 124, 128 and 130. The frame structure 138 is used to connect a bracket 139 used to support the steering wheel 28 on a left side thereof and to connect the fuel tank 36 on a right side thereof. The frame structure 138 is made of a plurality of members. The legs of the frame structure 138 are connected to the generally vertical members 124 and extend upward and rearward therefrom as can be seen in FIG. 17. As would be understood, in countries where regulations require the steering wheel 28 to be disposed on a right side of the vehicle 10, the bracket 139 used to support the steering wheel 28 would be connected on the right side of the frame structure 138 and the fuel tank 36 would be connected on the left side of the frame structure 138.

Figure 9:
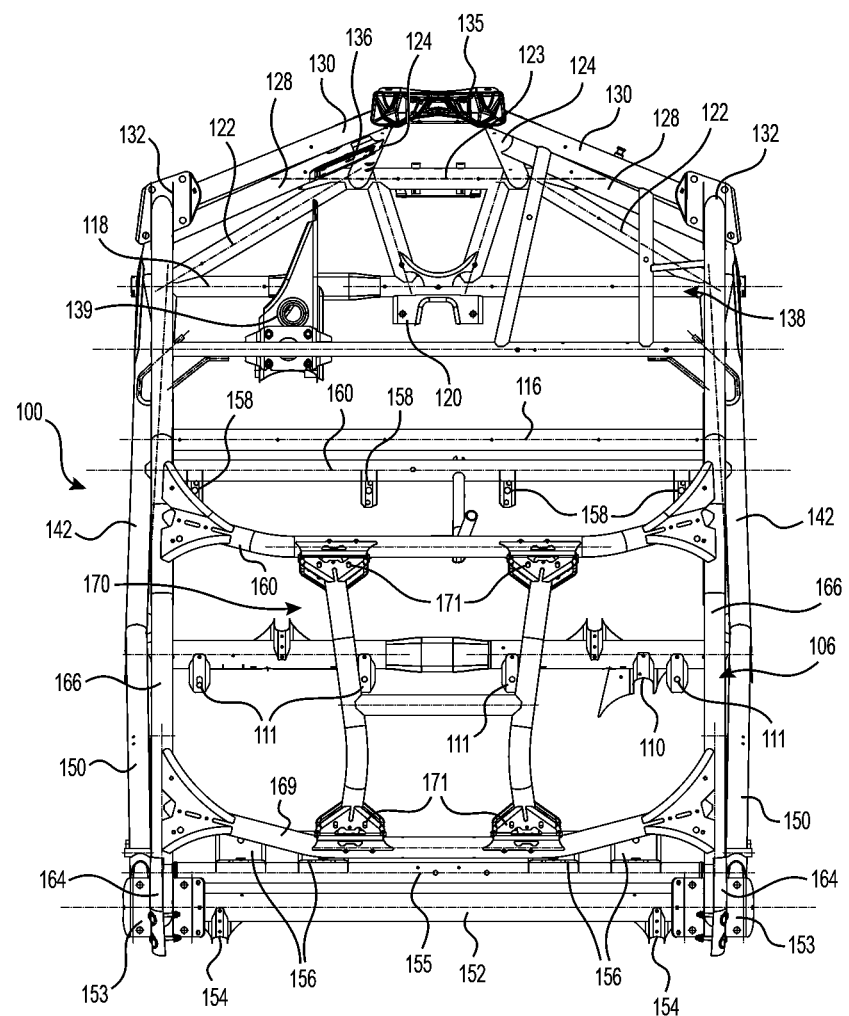
FIG. 9 is a top plan view of the central portion of the frame of FIG. 7.

Rear members 140 extend upward and rearward from the ends of the bottom member 108. Side members 142 are connected to and extend upward and rearward from vertical members 114. Cross-members 144 extend between and are connected to the rear portions of the bottom members 112 and of the side members 142. Each side member 142 and its corresponding bottom member 112 is provided with a bracket 146 extending between and connected to the front portions of the members 142, 112. Side members 148 are connected to the upper portion of the rear members 140. From the rear members 140, the side members 148 extend downward and forward and connect to the rear ends of the side members 142. Brackets 150 connect the front portions of the side members 142 to the generally vertical members 114. A laterally extending member 152 is connected to the tops of the rear members 140. Brackets 153 are connected to the top of notches formed in the ends of the member 152. As best seen in FIG. 9, brackets 154 are connected to the back of the member 152. The brackets 154 are used to connect a portion of the rear suspension assemblies 20, as will be described in greater detail below. Another laterally extending member 155 is connected between the rear members 140 below the laterally extending member 152. Brackets 156 are connected to the laterally extending member 155. The brackets 156 are used to connect seat belt mechanisms 157 (FIG. 40) of the seats 24, 26. Two seat belt mechanisms 157 are provided per seat 24, 26 as the seat belts are four-point harnesses. It is contemplated that a single seat belt mechanism 157' (see FIGS. 39, 40) could be provided should the seat belts be three-point seat belts. In such an embodiment, the seat belt mechanisms 157' would be mounted to the rear members 140 of the central portion of the frame 12.

Figure 7:
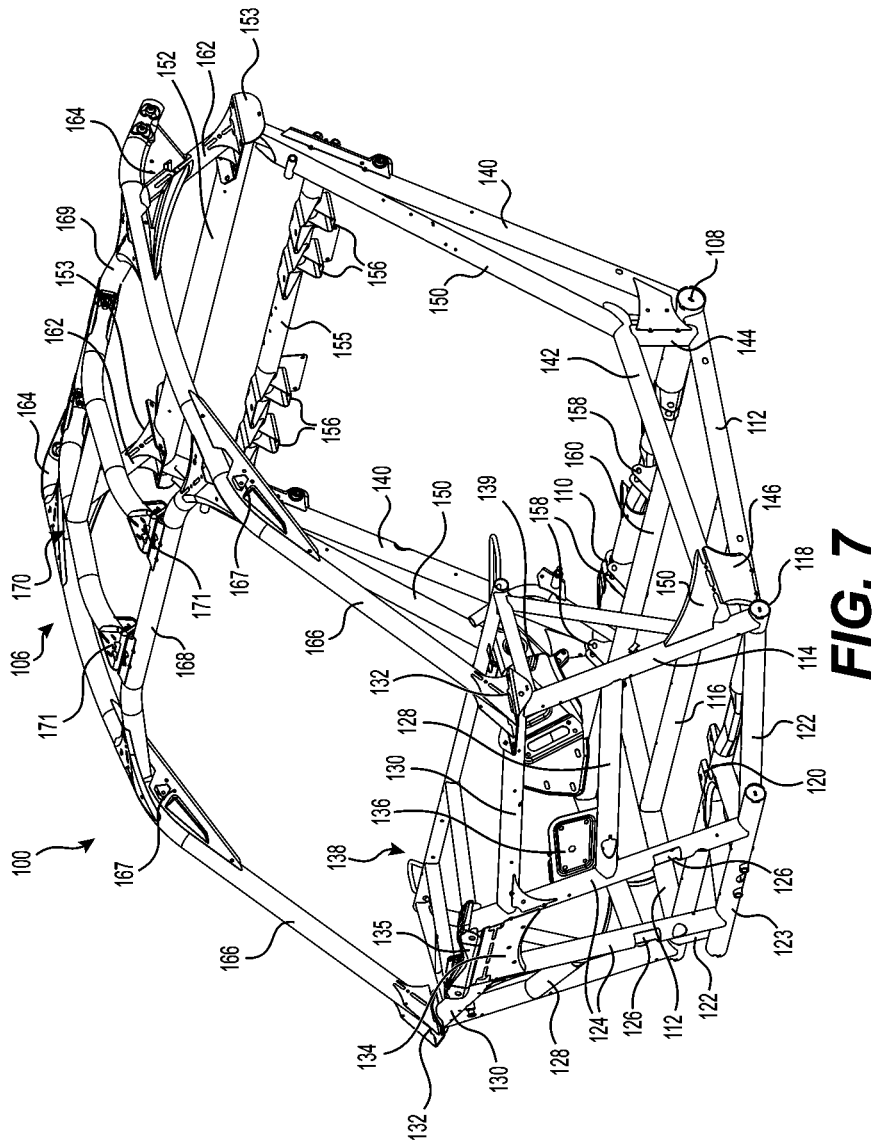
FIG. 7 is a perspective view, taken from a front, left side, of a central portion of the frame of FIG. 6.

As best seen in FIG. 7, a laterally extending member 160 extends between and connects to the side member 142 such that the member 160 is vertically spaced from and parallel to the bottom member 116. The brackets 158 are connected to the member 160 and are used to fasten the seats 24, 26 to the central portion 100 of the frame 12.

Figure 6:
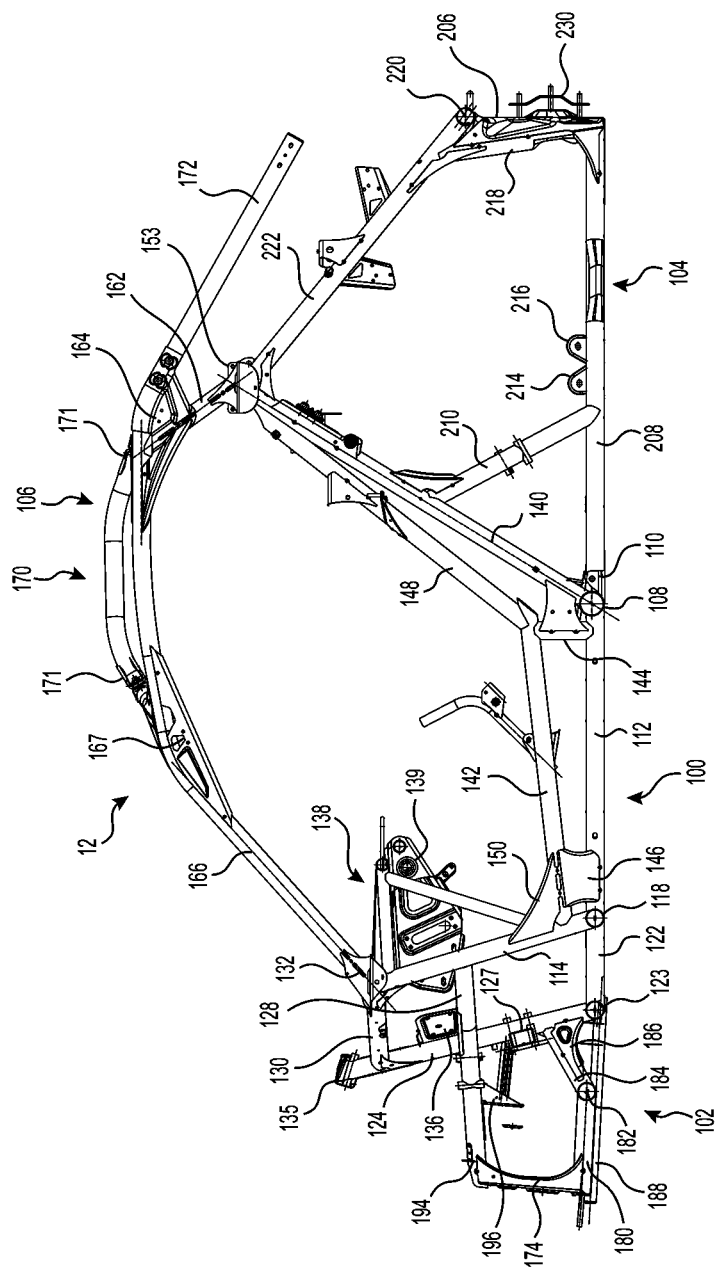
FIG. 6 is a left side elevation view of a frame of the vehicle of FIG. 1.

The roll cage 106 is connected at its front to the brackets 132 and at its rear to the brackets 153. Legs 162 are connected to and extend upward and forward from the brackets 153. The upper ends of the legs 162 are received in and connected to connectors 164. Legs 166 are connected to and extend upward and rearward from the brackets 132. The upper ends of the legs 166 are received in and connected to the connectors 164. As best seen in FIG. 8, the legs 166 are bent near their center points. Brackets 167 are provided at the bend in the legs 166. A front cross-member 168 is connected to and extends between the legs 166. The cross-member 168 is connected to the legs 166 at points disposed slightly rearward of the bends in the legs 166. The cross-member 168 has two angled portions and a lateral portion disposed between the angled portions. The angled portions of the cross-member 168 extend upward, rearward and laterally inward from the legs 166. A rear cross-member 169 is connected to and extends between the legs 166. The cross-member 169 is disposed rearward of the cross-member 168. The cross-member 169 is connected to the legs 166 at points disposed forward of the upper ends of the legs 162. The cross-member 169 has two angled portions and a lateral portion disposed between the angled portions. The angled portions of the cross-member 169 extend rearward and laterally inward from the legs 166. As best seen in FIG. 9, the lateral portion of the cross-member 168 is longer than the lateral portion of the cross-member 169. A generally H-shaped frame structure 170 is connected by brackets 171 between the cross-members 168, 169. The H-shaped frame structure 170 extends over the central portion of the cockpit area 22. As can be seen in FIG. 8, the H-shaped frame structure 170 is arched and is vertically higher than the top of the legs 166. As can be seen in FIGS. 6 and 36, legs 172 connect to the connectors 164 and extend rearward, downward and laterally inward therefrom. The legs 172 extend through the rear fenders 50 and are connected to the floor 58 of the cargo space 56. Brackets (not shown) connect the rear of the legs 172 to the rear portion 104 of the frame 12.

Figure 10:
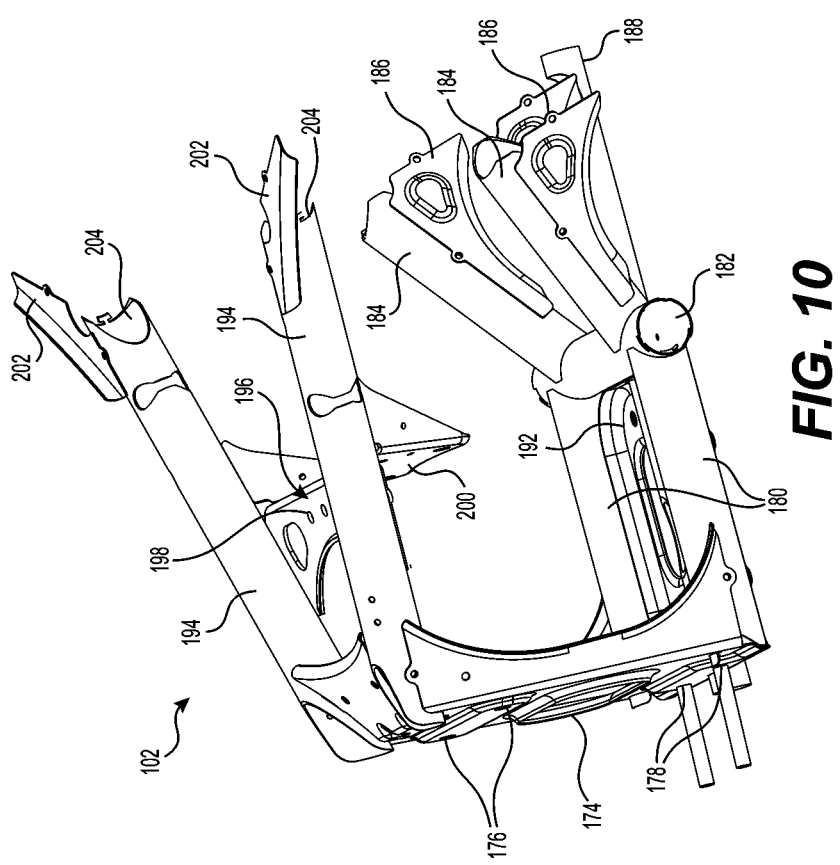
FIG. 10 is a perspective view, taken from a front, left side, of a front portion of the frame of FIG. 6.
Figure 11:
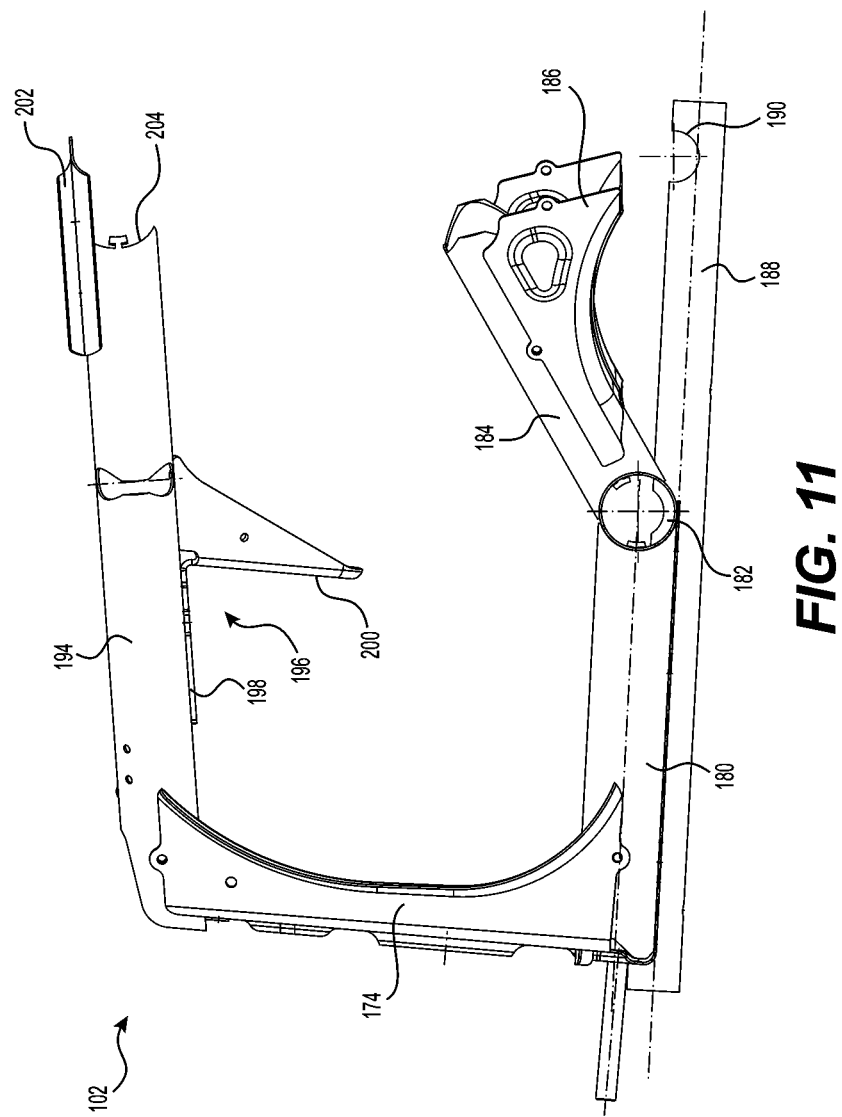
FIG. 11 is a left side elevation view of the front portion of the frame of FIG. 10.
Figure 12:
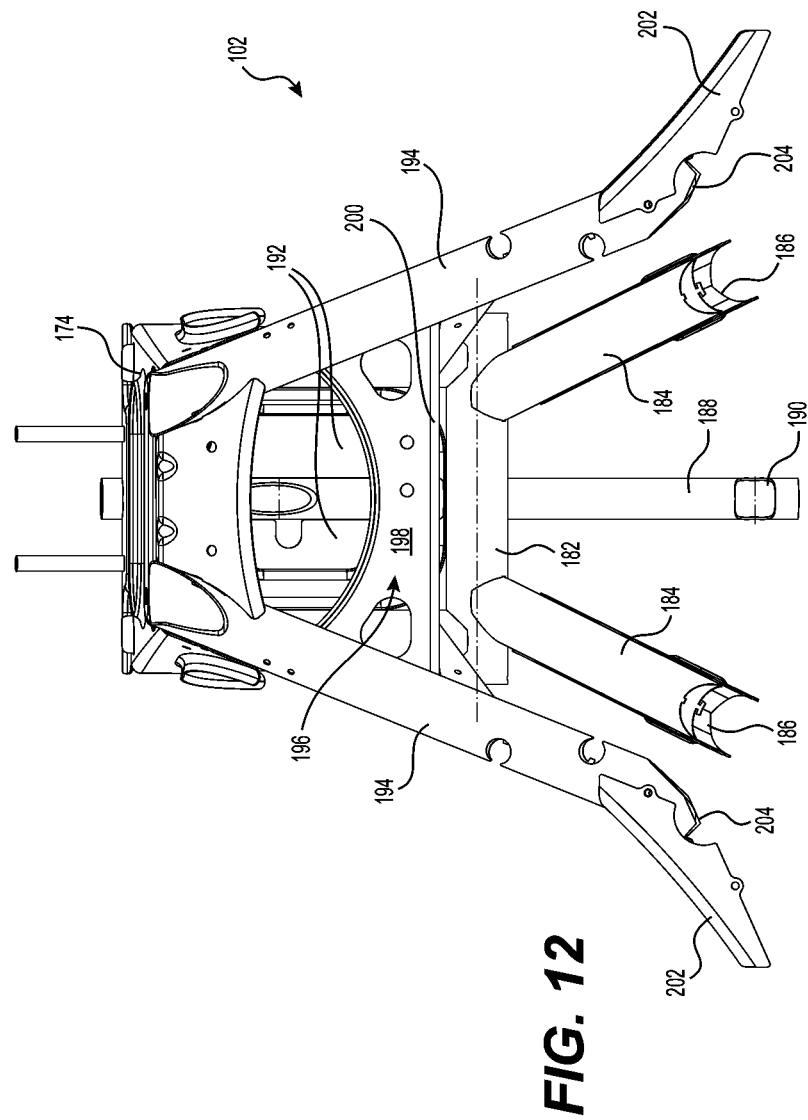
FIG. 12 is a top plan view of the front portion of the frame of FIG. 10.

Turning now to FIGS. 10 to 12, the front portion 102 of the frame 12 will be described. The front portion 102 of the frame 12 has a front bracket 174. The front face of the front bracket 174 has two apertures 176 and two apertures 178 for connecting the front suspension assemblies 16 as will be described in greater detail below. These components of the front suspension assemblies 16 are disposed between the front bracket 174 and a bumper frame assembly 179 as can be seen in FIG. 17.

Two longitudinally extending members 180 connect to and extend rearward and slightly downward from the lower corners of the bracket 174. A laterally extending member 182 connects to the rear ends of the members 180. Two members 184 connect to the member 182 at positions that are laterally inward of the positions where the members 180 connect to the member 182. From the member 182, the members 184 extend upward, rearward and laterally outward. Generally triangular brackets 186 are connected to the members 184 and are disposed below the members 184. The brackets 186 are connected to the vertical members 124 of the central portion 100 of the frame 12 below the notches 126.

A longitudinally extending member 188 is connected to the center of the bottom of the bracket 174 and to the center of the bottom of the laterally extending member 182. The member 188 is parallel to the members 180. As can be seen in FIG. 11, the member 188 extends rearward of the member 182. The member 188 defines a notch 190 in a rear portion thereof. The bottom member 123 of the central portion 100 of the frame 12 is received in the notch 190 of the member 188 and is connected to the member 188. Plates 192 are provided on either sides of the member 188. Each plate 192 is connected to the bracket 174, the member 182 and its respective member 180 to close the opening defined between these components.

Two members 194 connect to and extend rearward, upward and laterally outward from the upper corners of the bracket 174. A bracket 196 is connected between the front portions of the members 194 rearward of the bracket 174. The bracket 196 has a top plate 198 and a rear plate 200. The rear plate 200 has two apertures for connecting the front suspension assemblies 16 as will be described in greater detail below. Generally triangular brackets 202 are connected to the members 194 and are disposed on the laterally outward sides of the members 124. The rear ends of the members 194 have notches 204 inside which are received the horizontal members 128 of the central portion 100 of the frame 12 to connect the members 194 to the horizontal members 128.

Turning now to FIGS. 13 to 16, the rear portion 104 of the frame 12 will be described. The rear portion 104 has a mounting bracket 206. Two bottom members 208 connect to and extend forward and laterally outward from the lower corners of the mounting bracket 206. The front ends of the members 208 are connected to the rear of the bottom member 108 of the central portion 100 of the frame 12. The members 208 are connected to the bottom member 108 at positions that are laterally inward of the brackets 110. As can be seen in FIG. 6, the bottoms of the members 208 and the members 112 are aligned with each other. Two members 210, seen in FIGS. 6 and 36, are connected at their bottom ends to the bottom members 208, extend upward, forward and outward therefrom and connect at their top ends to the rear members 140 of the central portion of the frame 12. A laterally extending member 212 extends between the members 208 at a position longitudinally between the bottom member 108 and the mounting bracket 206. A bracket 214 is connected to the member 212 at a position laterally between the left bottom member 208 and the lateral center of the member 212. A bracket 216 is connected to the member 212 at a position laterally between the right bottom member 208 and the lateral center of the member 212. The bracket 214 extends forward of the member 212 and the bracket 216 extends rearward of the member 212. The brackets 214, 216 connect the engine 30 to the rear portion 104 of the frame 12.

Figure 14:
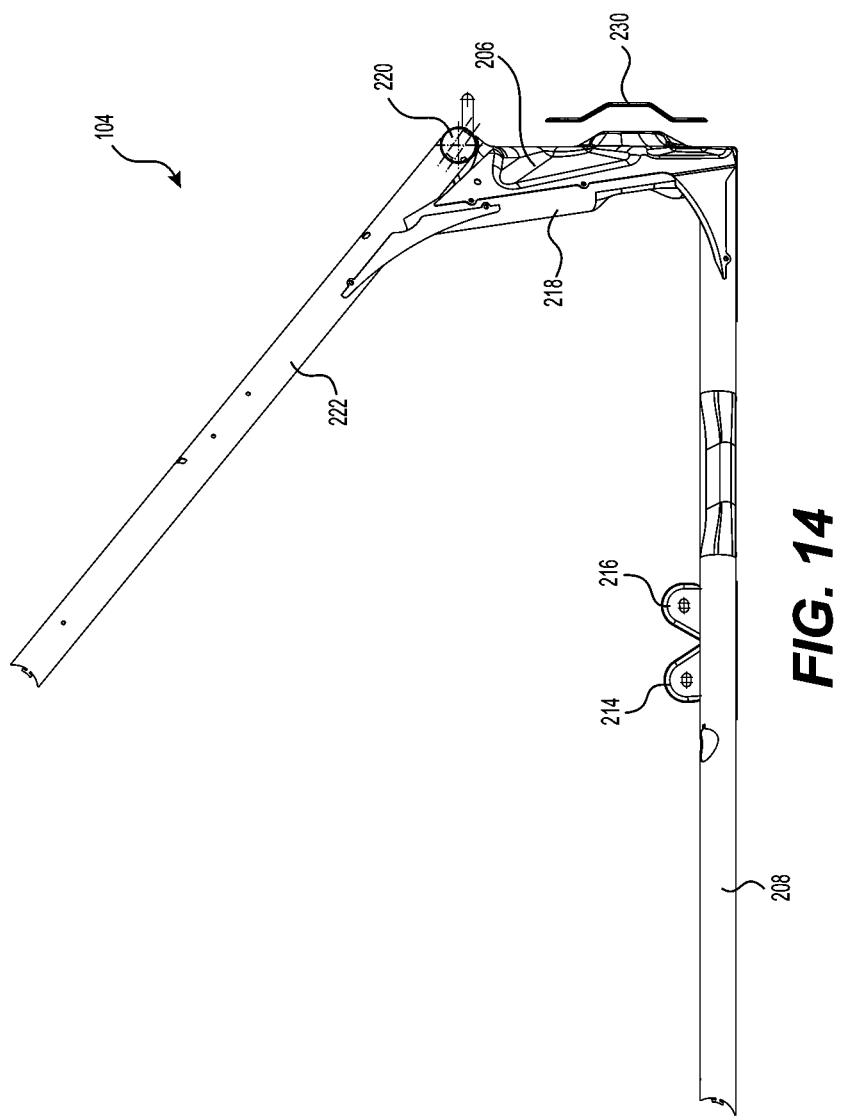
FIG. 14 is a left side elevation view of the rear portion of the frame of FIG. 13.
Figure 15:
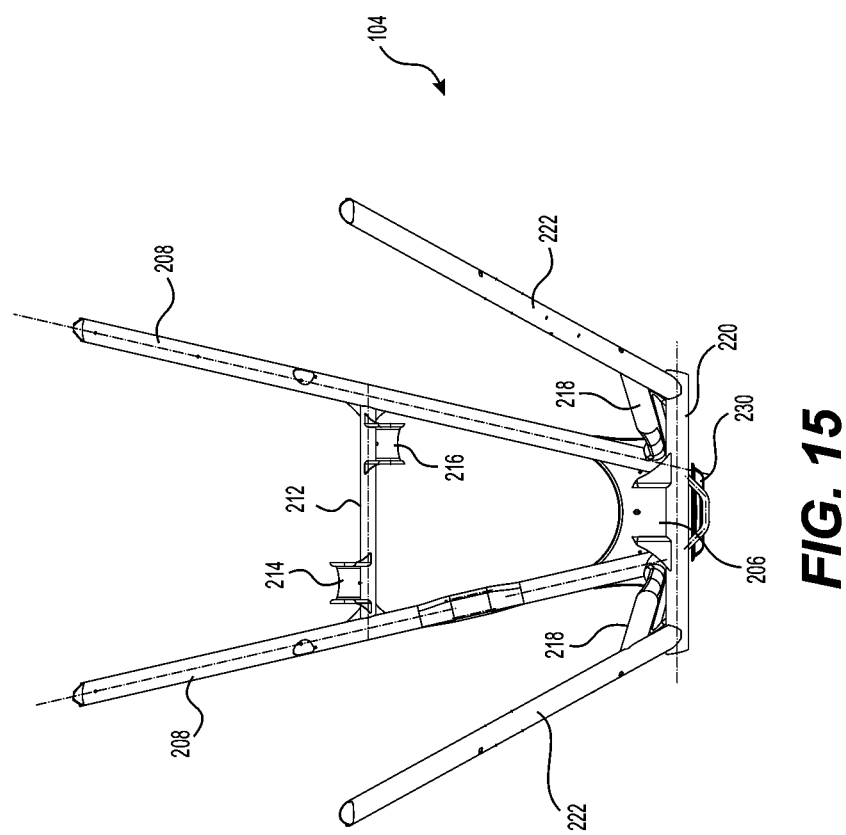
FIG. 15 is a top plan view of the rear portion of the frame of FIG. 13.

Two members 218 are connected to the rear ends of the members 208. From the members 208, the members 218 extend upward, forward and laterally outward. The members 218 extend along the front portion of the bracket 206 as can be seen in FIG. 14. Two members 222 are connected to the top ends of the members 218. A laterally extending member 220 is connected to the rear ends of the members 222 and is located on top of the bracket 206. The member 220 is disposed rearward of the members 218 and lower than the top ends of the members 218 as can be seen in FIG. 14. The two members 222 are connected near the ends of the member 220. From the member 220, the members 222 extend forward, upward and laterally outward. The top ends of the members 222 are connected to the ends of the member 152 of the central portion 100 of the frame 12.

Figure 13:
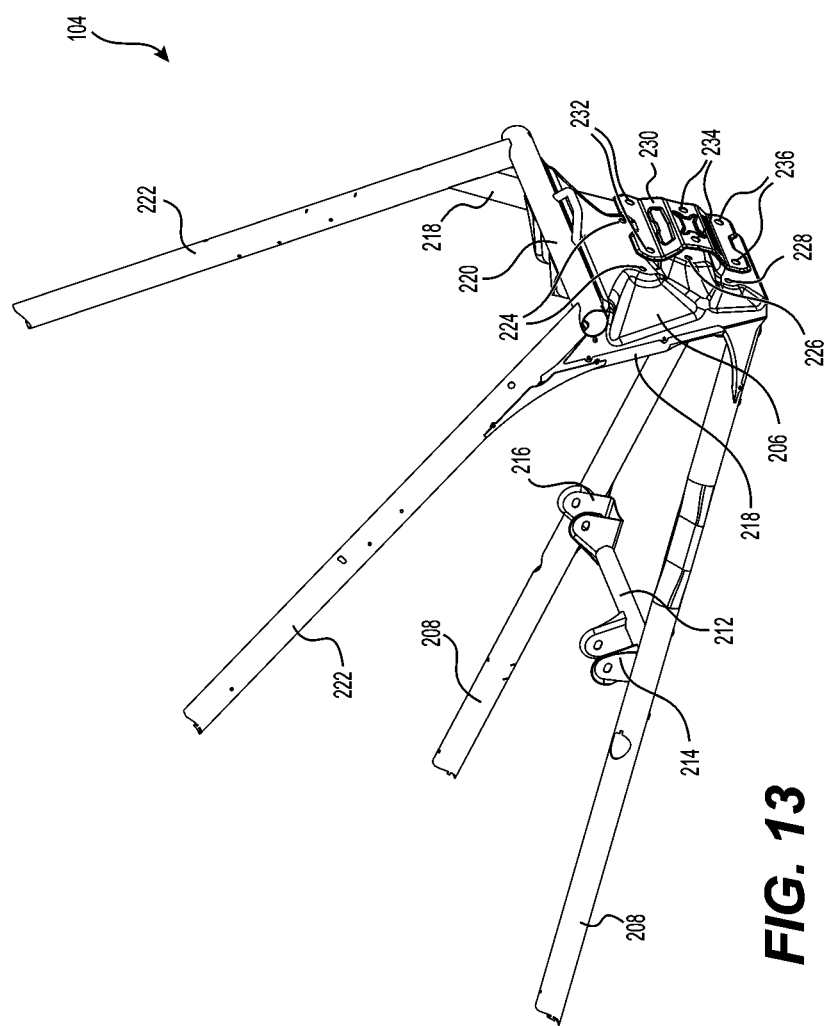
FIG. 13 is a perspective view, taken from a rear, left side, of a rear portion of the frame of FIG. 6.

As can be see in FIG. 13, the bracket 206 has two apertures 224, two apertures 226 (only one shown) and two apertures 228 (only one shown). The apertures 226 are defined in a surface of the bracket 206 that is more rearward than the surface in which the apertures 224 and 228 are defined. The apertures 224, 226 and 228 are used to connect components of the rear suspension assemblies 20 as will be described in greater detail below. These components of the rear suspension assemblies 20 are disposed between the bracket 208 and a bracket 230. The bracket 230 is disposed rearward of the bracket 206. As can be seen in FIG. 13, the bracket 230 has two apertures 232, two apertures 234 and two apertures 236 which are aligned with the apertures 224, 226 and 228 respectively. The apertures 234 are defined in a surface of the bracket 230 that is more rearward than the surfaces in which the apertures 232 and 236 are defined.

Figure 16:
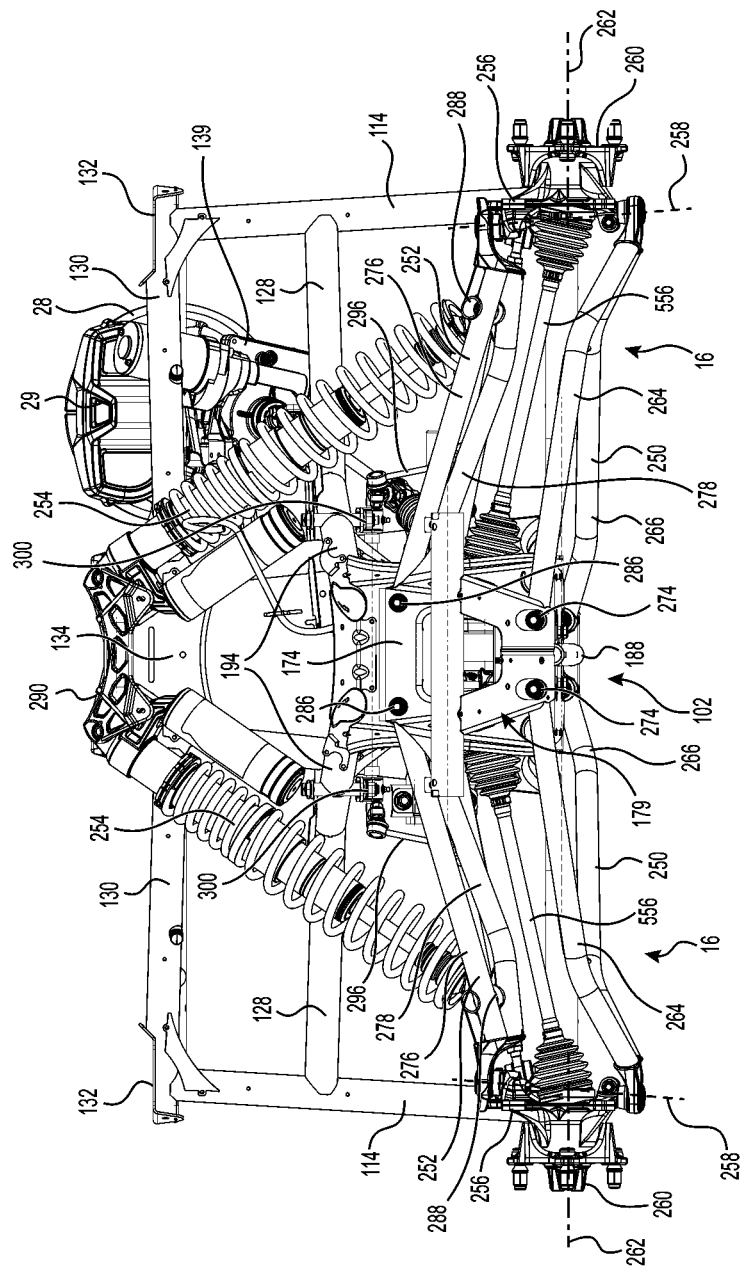
FIG. 16 is a front elevation view of the front suspension assemblies and associated frame portions of the vehicle of FIG. 1.
Figure 18:
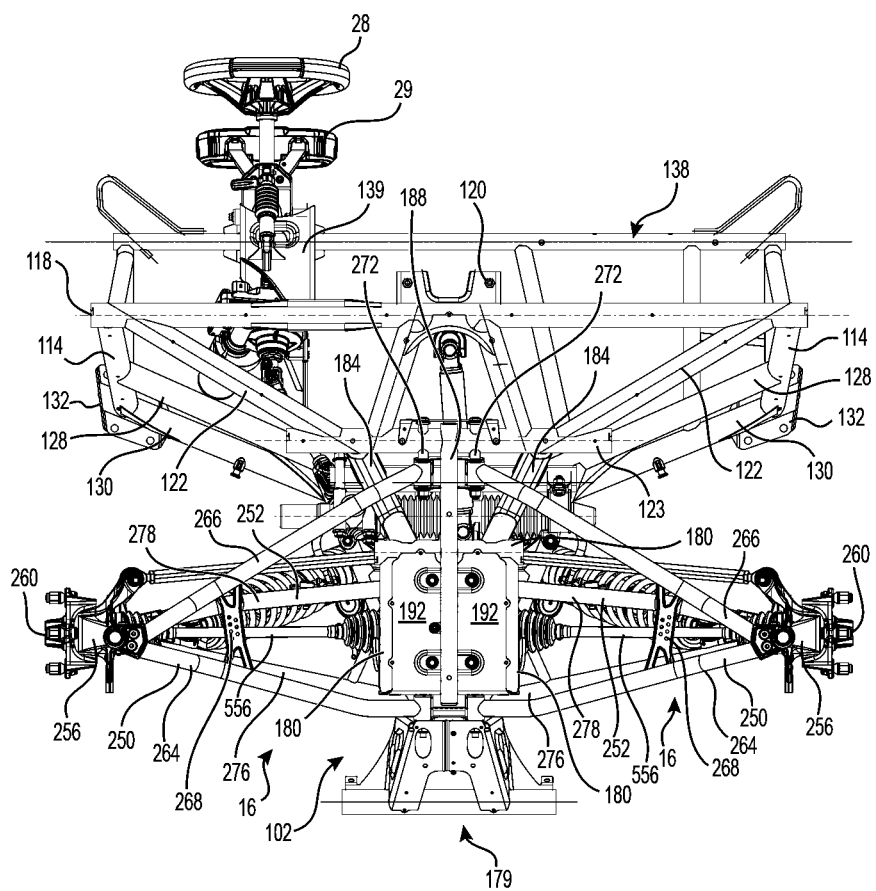
FIG. 18 is a bottom plan view of the components of FIG. 16.

Turning now to FIGS. 16 to 18, the front suspension assemblies 16 will be described in more detail. As the left and right front suspension assemblies 16 are mirror images of each other, only the right front suspension assembly 16 will described in detail. Components of the left front suspension assembly 16 that correspond to those of the right front suspension assembly 16 have been labeled with the same reference numerals in the figures.

The front suspension assembly 16 is a double A-arm suspension assembly. As such, the front suspension assembly 16 has a lower A-arm 250, an upper A-arm 252 and a shock absorber assembly 254. The shock absorber assembly 254 includes a coil spring disposed around a hydraulic shock, and the hydraulic shock has a separate reservoir connected to it. Since shock absorber assemblies of this type are well known, the shock absorber assembly 254 will not be described in greater detail.

As can be seen in FIG. 16, the lower A-arm 250 is longer in a lateral direction than the upper A-arm 252. The laterally inward ends of the upper and lower A-arms 250, 252 are pivotally connected to the frame 12 as will be described below. The laterally outward ends of the A-arms 250 and 252 are pivotally connected to the bottom and the top of a kingpin 256 respectively. The kingpin 256 pivots relative to the A-arms 250, 252 about an axis 258 (FIG. 16) that is the steering axis of the front wheel 14. The front wheel 14 is connected to a hub 260 that is rotationally connected to the kingpin 256 such that the wheel 14 can rotate about the wheel rotation axis 262 (FIG. 16).

As best seen in FIG. 18, the lower A-arm 250 has a front arm 264 and a rear arm 266. A bracket 268 (FIG. 18) is connected between the front and rear arms 264, 266 near their laterally outward ends. The laterally inward end of the front arm 264 is pivotally connected to the front bracket 174 of the front portion 102 of the frame 12 via the aperture 178. As can be seen in FIG. 17, the laterally inward end of the front arm 264 is disposed in front of the front bracket 174. The bumper frame assembly 179 is disposed in front of the laterally inward ends of the front arms 264 of both lower A-arms 250 (i.e. of the left and right suspension assemblies 16) such that the laterally inward ends of the front arms 264 are held between the front bumper assembly 179 and the front bracket 174. The laterally inward end of the rear arm 266 is pivotally connected to the bottom member 123 of the central portion 100 of the frame 12 via a tube 272 (FIG. 17) connected to the bottom member 123. As can be seen, the laterally inward end of the rear arm 266 is disposed in front of the bottom member 122. The laterally inward ends of the front and rear arms 264, 266, and therefore the lower A-arm 250, pivot about a pivot axis 274.

Figure 19:
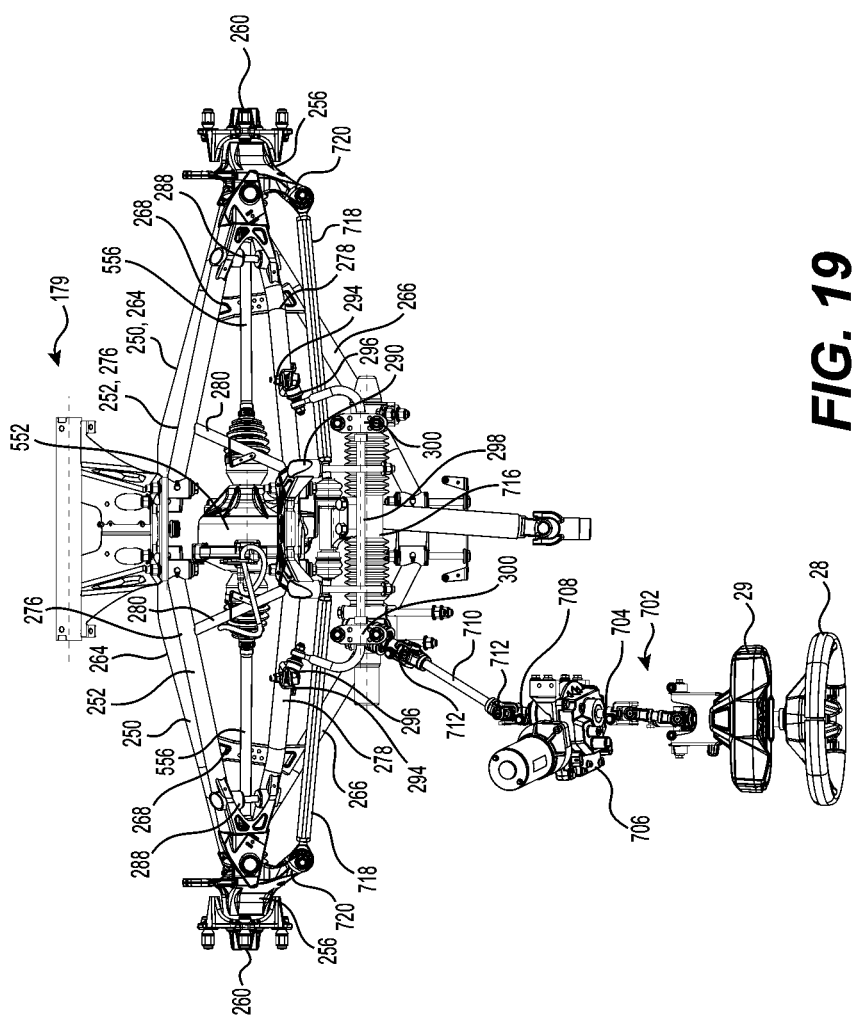
FIG. 19 is a top plan view of the front suspension assemblies of FIG. 16 with the shock absorber assemblies removed, a steering assembly and a front portion of a powertrain of the vehicle of FIG. 1.

As best seen in FIG. 19, the upper A-arm 252 has a front arm 276 and a rear arm 278. A cross-member 280 is connected between the front and rear arms 276, 278. The laterally inward end of the front arm 276 is pivotally connected to the front bracket 174 of the front portion 102 of the frame 12 via the aperture 176. As can be seen in FIG. 17, the laterally inward end of the front arm 276 is disposed in front of the front bracket 174. The front bumper assembly 179 is disposed in front of the laterally inward ends of the front arms 276 of both upper A-arms 252 (i.e. of the left and right suspension assemblies 16) such that the laterally inward ends of the front arms 276 are held between the front bumper assembly 179 and the front bracket 174. The laterally inward end of the rear arm 278 is pivotally connected to the rear plate 200 of the bracket 196 of the front portion 102 of the frame 12. The laterally inward end of the rear arm 278 is disposed in front of the rear plate 200. A plate (not shown) is disposed in front of the laterally inward ends of the rear arms 278 of both upper A-arms 252 (i.e. of the left and right suspension assemblies 16) such that the laterally inward ends of the rear arms 278 are held between this plate and the rear plate 200. The laterally inward ends of the front and rear arms 276, 278, and therefore the upper A-arm 252, pivot about a pivot axis 286. The pivot axis 286 of the upper A-arm 252 is parallel to the pivot axis 274 of the lower A-arm 250 and both pivot axes 274, 286 extend downward as they extend rearward and extend parallel to a vertical plane passing through the centerline 37 of the vehicle 10. As best seen in FIG. 16, the pivot axes 274 of the two lower A-arms 250 are disposed laterally closer to each other than the pivot axes 286 of the two upper A-arms 252. As best seen in FIG. 17, the laterally inward ends of the upper A-arm 252 are disposed closer to each other in the longitudinal direction of the vehicle 10 than the laterally inward ends of the lower A-arm 250.

Figure 20:
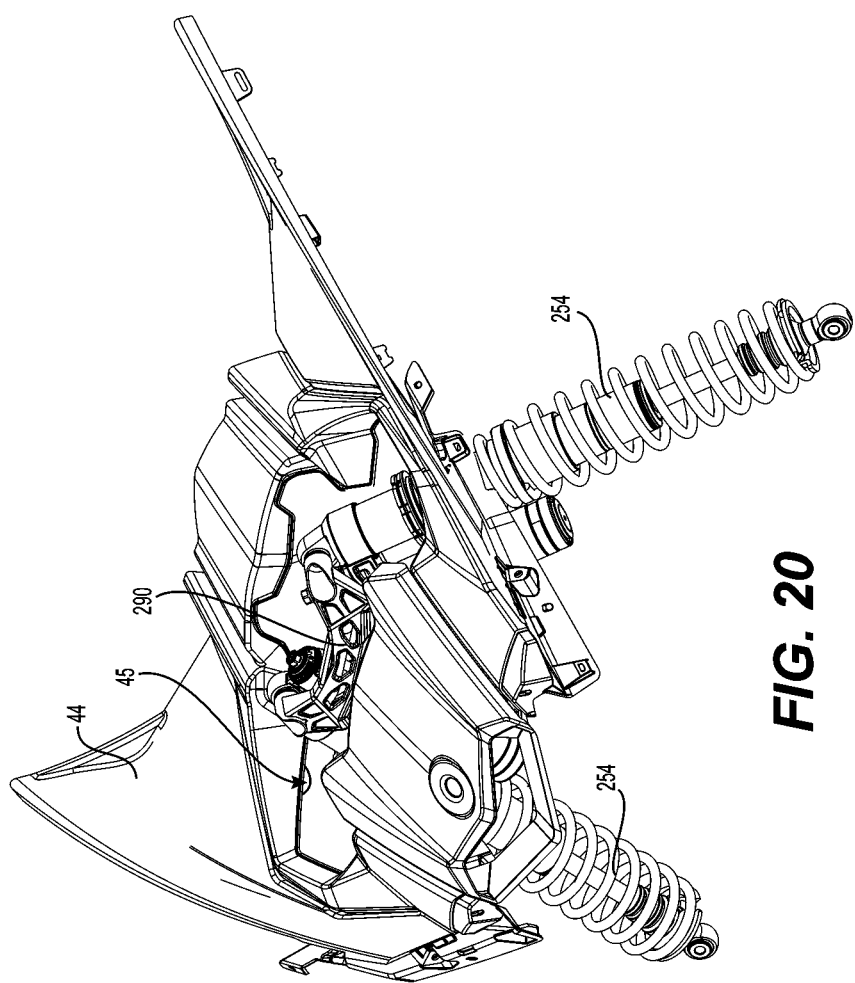
FIG. 20 is a perspective view taken from a front, left side of the hood of and front shock absorber assemblies of the vehicle of FIG. 1.
Figure 21:
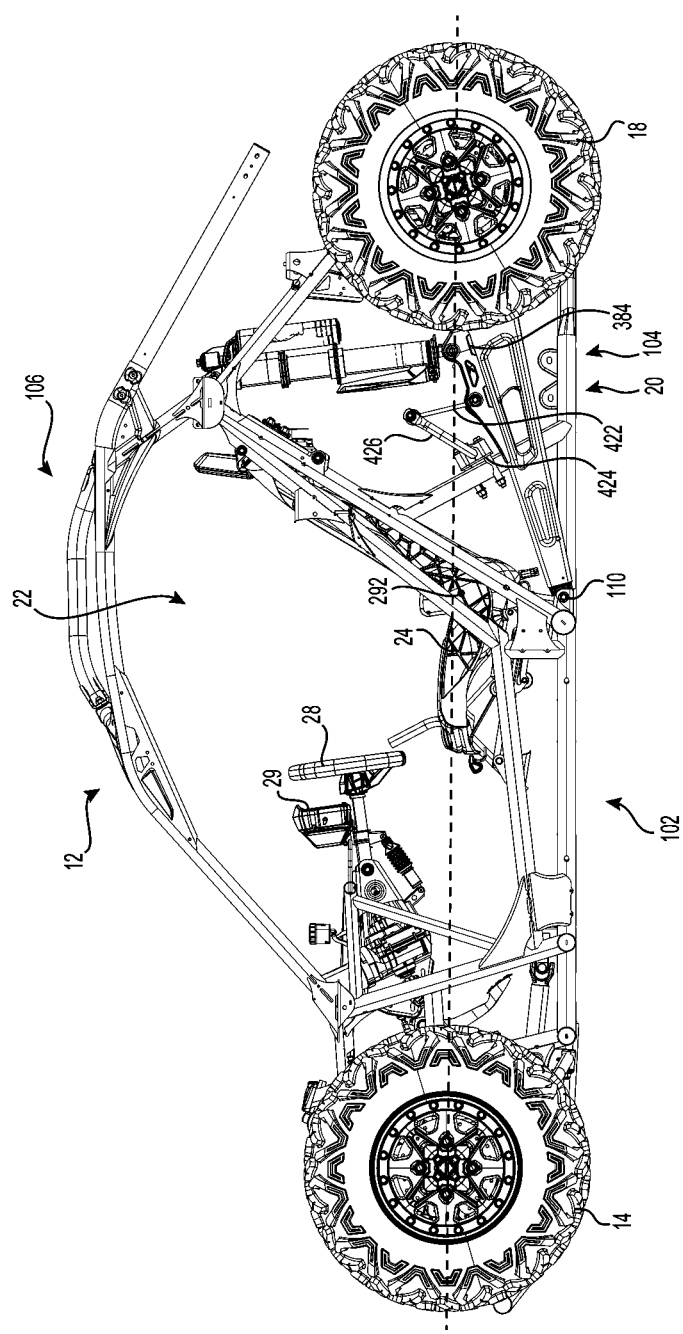
FIG. 21 is a left side elevation view of the frame, seats, steering assembly, wheels, front suspension assemblies, rear suspension assemblies and other components of the vehicle of FIG. 1, with the front and rear suspension assemblies being fully compressed.

As best seen in FIG. 19, a shaft 288 is connected to the top of the front and rear arms 276, 278 near their laterally outward ends. The shaft 288 pivotally connects the lower end of the shock absorber assembly 254 to the upper A-arm. From its lower end, the shock absorber assembly 254 extends upward, rearward and laterally inward. As best seen in FIG. 17, the upper end of the shock absorber assembly 254 is pivotally connected to the bracket 135 of the central portion 10 of the frame 12. The upper end of the shock absorber assembly 254 is disposed in front of the vertical member 124. A bracket 290 is disposed in front of the upper ends of the shock absorber assemblies 254 of the left and right suspension assemblies 16 such that the upper ends of the shock absorber assemblies 254 are held between the bracket 290 and the bracket 135. As best seen in FIG. 20, the shock absorber assemblies 154 and the bracket 290 extend through an aperture 45 in the cover 44 of the vehicle 10. Although not shown in FIG. 20, the bracket 135 also extends through the aperture 45. As a result, the upper ends of the shock absorber assemblies 254 and the brackets 135, 290 are disposed above the cover 44 and are visible from outside the vehicle 10. As can be seen in FIG. 21, when the shock absorber assembly 254 of the front suspension assembly 16 is fully compressed, the center of the corresponding front wheel 14 is disposed vertically higher than the H-point 292 of the driver sitting in the driver seat 24 with the driver seat 24 in its rearmost position. The H-point corresponds to the pivot axis between a human torso and thigh as defined by the H-point template and H-point machine in SAE J826 (as revised in November 2008), the entirety of which is incorporated herein by reference.

Turning back to FIGS. 16, 17 and 19, each upper A-arm 252 has a bracket 294 (FIG. 19) connected on top of its rear arm 278. Links 296 are connected at their lower ends by ball joints to the brackets 294. The links 296 extend generally vertically and are connected at their upper ends to opposite ends of a sway bar 298 by ball joints. The sway bar 298 is supported by a pair of bushings 300. The bushings 300 are connected to the bottom of the members 194 of the front portion 102 of the frame 12.

Turning now to FIGS. 23 to 27, the rear suspension assemblies 20 will be described in more detail. As the left and right rear suspension assemblies 20 are mirror images of each other, only the right rear suspension assembly 20 will described in detail. Components of the left rear suspension assembly 20 that correspond to those of the right rear suspension assembly 20 have been labeled with the same reference numerals in the figures.

Figure 23:
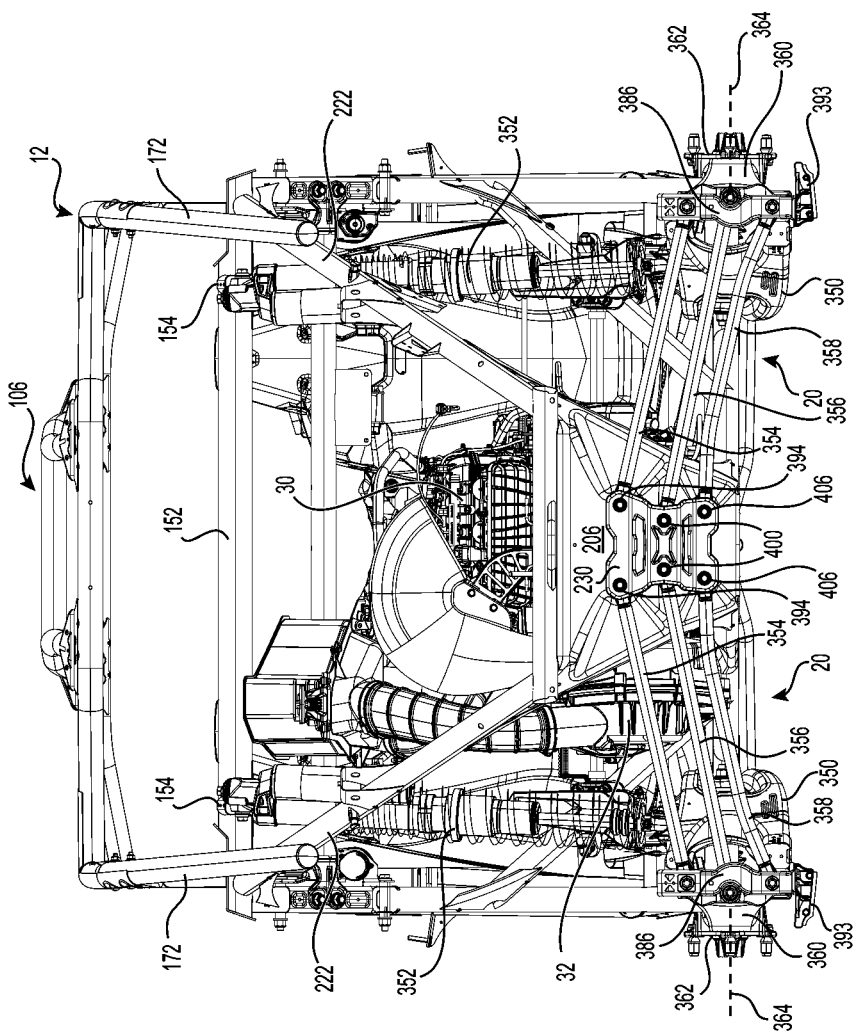
FIG. 23 is a rear elevation view of the frame, seats, engine and rear suspension assemblies of the vehicle of FIG. 1.
Figure 24A:
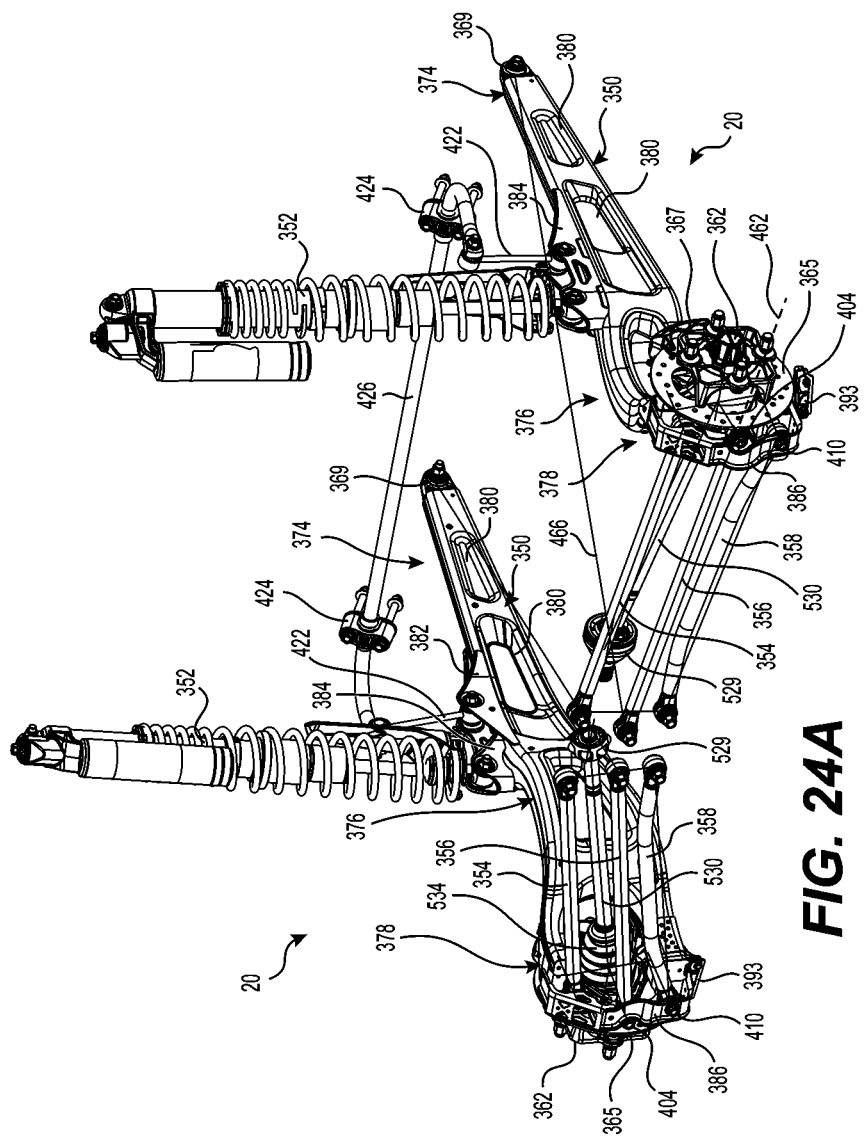
FIG. 24A is a perspective view, take from a rear, left side of the rear suspension assemblies of the vehicle of FIG. 1.

The rear suspension assembly 20 has a trailing arm 350, a shock absorber assembly 352, an upper link 354, a toe link 356 and a lower link 358. The ends of the links 354, 356, 358 have ball joints. The trailing arm 350 and the links 354, 356, 358 are connected to a knuckle 360 as will be described in greater detail below. A hub 362 (FIG. 23) is rotationally connected to the knuckle 360. The rear wheel 18 is connected to the hub 362 such that the wheel 18 can rotate about the wheel rotation axis 364 (FIGS. 23, 24B). As best seen in FIG. 24A, a brake disk 365 is mounted to the hub 362. A brake caliper 367 is mounted to the knuckle 360.

Figure 26:
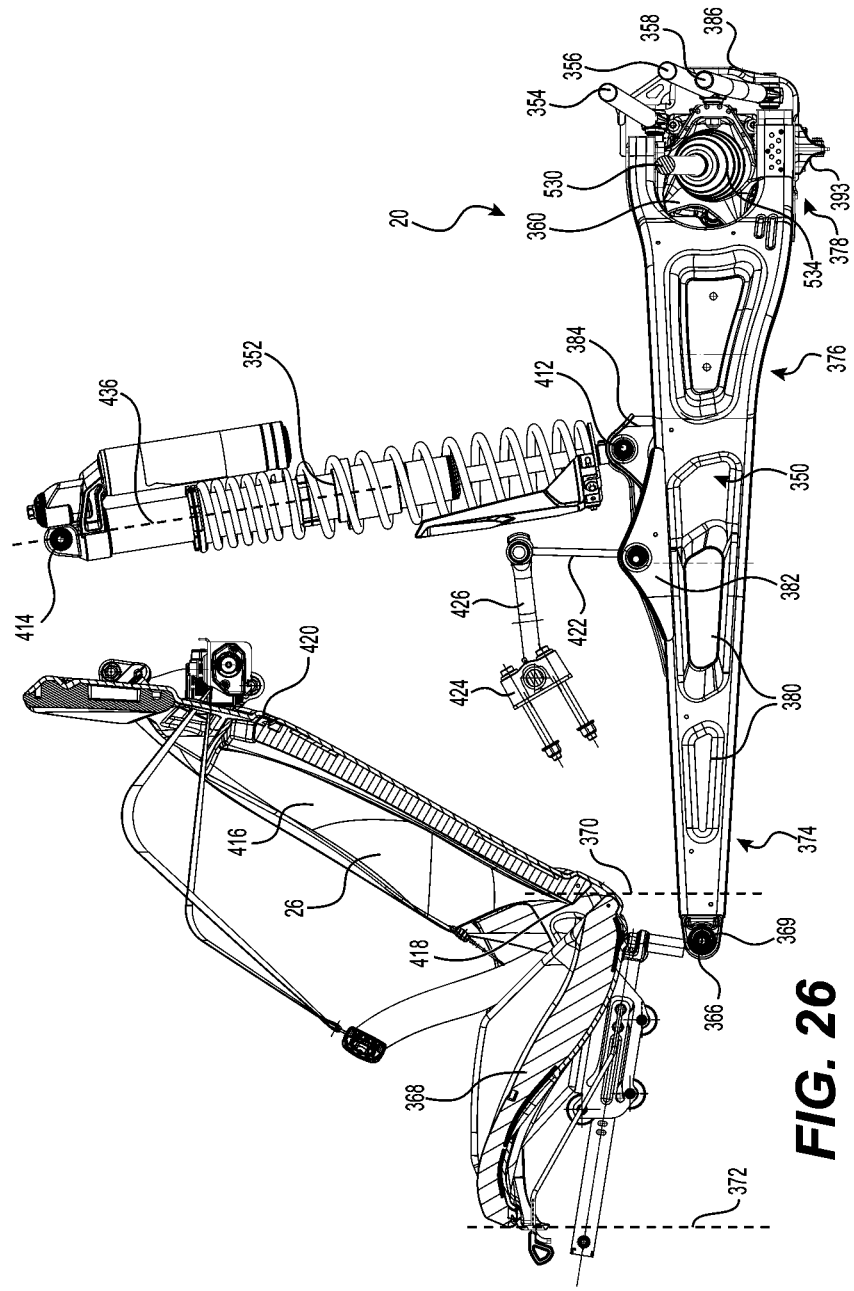
FIG. 26 is a partial cross-sectional view of the right rear suspension assembly and passenger seat of the vehicle of FIG. 1, taken through line 26-26 of FIG. 25A.

The trailing arm 350 is pivotally connected at its front end to the bracket 110 of the central portion 100 of the frame 12 by a ball joint 369. The ball joint 369 is connected about an axis 366 (FIG. 26) that is disposed below the passenger seat 26. As can be seen in FIG. 26, when the passenger seat 26 is in its rearmost position as shown, the axis 366 is disposed forward of the rearmost point of the seat bottom 368 of the seat 26 and rearward of the forwardmost point of the seat bottom 368 (note: these points are contained in vertical lines 370, 372 respectively). The same is true for the axis 366 of the ball joint 369 of the left trailing arm 350 with respect to the driver seat 24.

Figure 27:
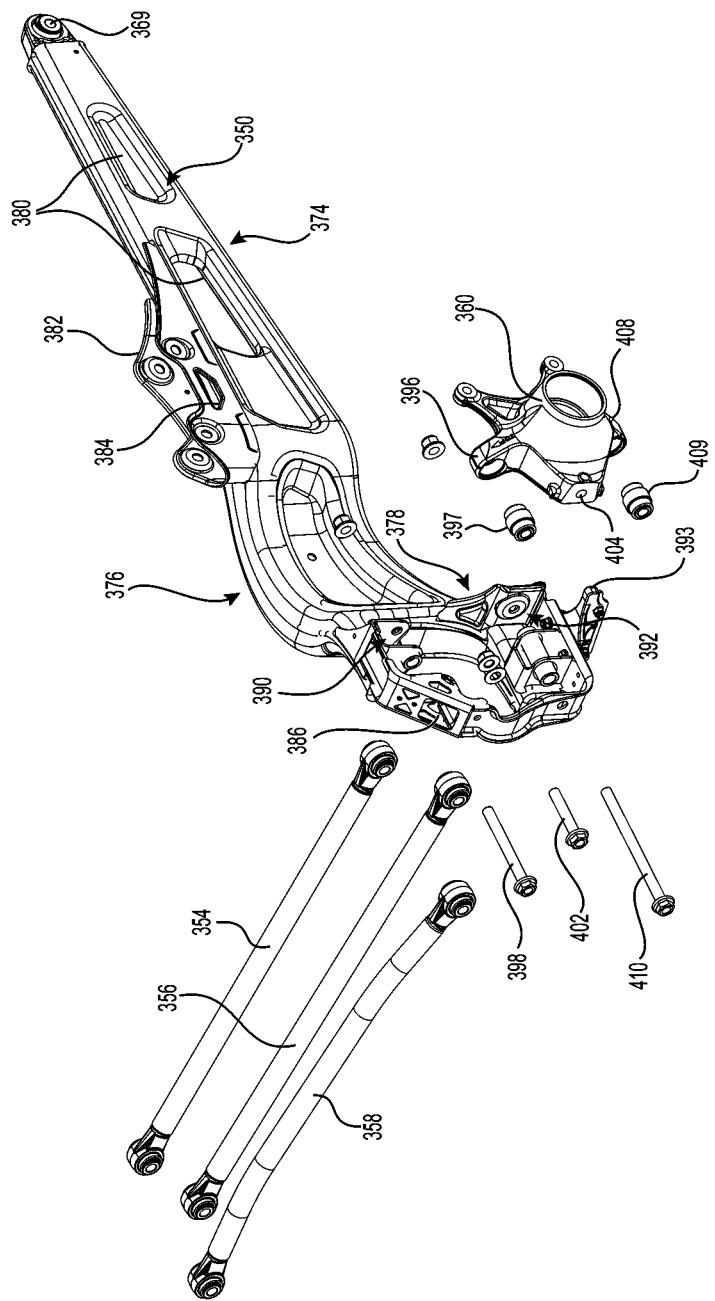
FIG. 27 is an exploded view of the trailing arm and links of the right suspension assembly of FIG. 26 and the right knuckle.

As best seen in FIG. 27, the trailing arm 350 has a front portion 374, a curved portion 376 and a knuckle receiving portion 378. The front portion 374 is straight and tapers toward it front. The front portion 374 defines two apertures 380. A plate 382 and a bracket 384 are connected to the top, rear portion of the front portion 374. The plate 382 and the bracket 384 are used to connect the lower end of the shock absorber assembly 352 and the torsion bar 426 as described below. The curved portion 376 is connected at its front end to the rear of the front portion 374. The curved portion 376 gets thicker as it extends rearward. The curved portion 376 is curved such that as it extends rearward, it initially extends laterally inward and then laterally outward. The rear end of the curved portion 376 is disposed laterally outward of the rear end of the front portion 374. The knuckle receiving portion 378 is connected at its front end to the rear of the curved portion 376. A brace 386 is connected to the rear of the knuckle receiving portion 378 to define a space inside which the knuckle 360 is received. Brackets 390, 392 are provided in the knuckle receiving portion 378 to connect the knuckle 360 to the trailing arm 350 as described below. A scraping member 393 is connected to the bottom of the knuckle receiving portion 378 and extends under the brake disk 365.

As best seen in FIG. 23, the laterally inward end of the upper link 354 is disposed longitudinally between the brackets 206, 230 of the rear portion 104 of the frame 12. A fastener 394 is inserted through the aperture 232 of the bracket 230 (FIG. 13), the aperture in the ball joint at the laterally inward end of the upper link 354, and the aperture 224 in the bracket 206 (FIG. 13) to pivotally fasten the upper link 354 to the rear portion 104 of the frame 12. The laterally outward end of the upper link 354 is disposed inside a recess formed between the bracket 390 and the brace 386. An upper tab 396 of the knuckle 360 has a ball joint 397 (FIG. 27) received therein at a position above the wheel rotation axis 364. The upper tab 396 is received in the bracket 390 forward of the laterally outward end of the upper link 354. As best seen in FIGS. 25A and 27, a single fastener 398 is inserted through the brace 386, the aperture in the ball joint at the laterally outward end of the upper link 354, the bracket 390 and the ball joint 397 in the upper tab 396 of the knuckle 360 to fasten the upper link 354, the knuckle 360 and the trailing arm 350 together.

As best seen in FIG. 23, the laterally inward end of the toe link 356 is disposed longitudinally between the brackets 206, 230 of the rear portion 104 of the frame 12. A fastener 400 is inserted through the aperture 234 of the bracket 230 (FIG. 13), the aperture in the ball joint at the laterally inward end of the toe link 356, and the aperture 226 in the bracket 206 (FIG. 13) to pivotally fasten the toe link 356 to the rear portion 104 of the frame 12. The laterally outward end of the toe link 356 is received between the brace 386 and the knuckle 360. The laterally outward end of the toe link 356 is pivotally fastened to the rear of the knuckle 360 by a fastener 402 inserted through the aperture in the ball joint at the laterally outward end of the toe link 356 and in an aperture 404 (FIG. 27) in the knuckle 360.

As best seen in FIG. 23, the laterally inward end of the lower link 358 is disposed longitudinally between the brackets 206, 230 of the rear portion 104 of the frame 12. A fastener 406 is inserted through the aperture 232 of the bracket 230 (FIG. 13), the aperture in the ball joint at the laterally inward end of the lower link 358, and the aperture 228 in the bracket 206 (FIG. 13) to pivotally fasten the lower link 358 to the rear portion 104 of the frame 12. The laterally outward end of the lower link 358 is disposed inside a recess formed between the brace 386 and the bracket 392. A lower tab 408 (FIG. 27) of the knuckle 360 has a ball joint 409 (FIG. 27) received therein at a position below the wheel rotation axis 364. The lower tab 408 is received in the bracket 392 forward of the laterally outward end of the lower link 358. As best seen in FIGS. 24A and 27, a single fastener 410 is inserted through the brace 286, the aperture in the ball joint at the laterally outward end of the lower link 358, the bracket 392 and ball joint 409 in the lower tab 408 of the knuckle 360 to fasten the lower link 358, the knuckle 360 and the trailing arm 350 together.

Figure 25B:
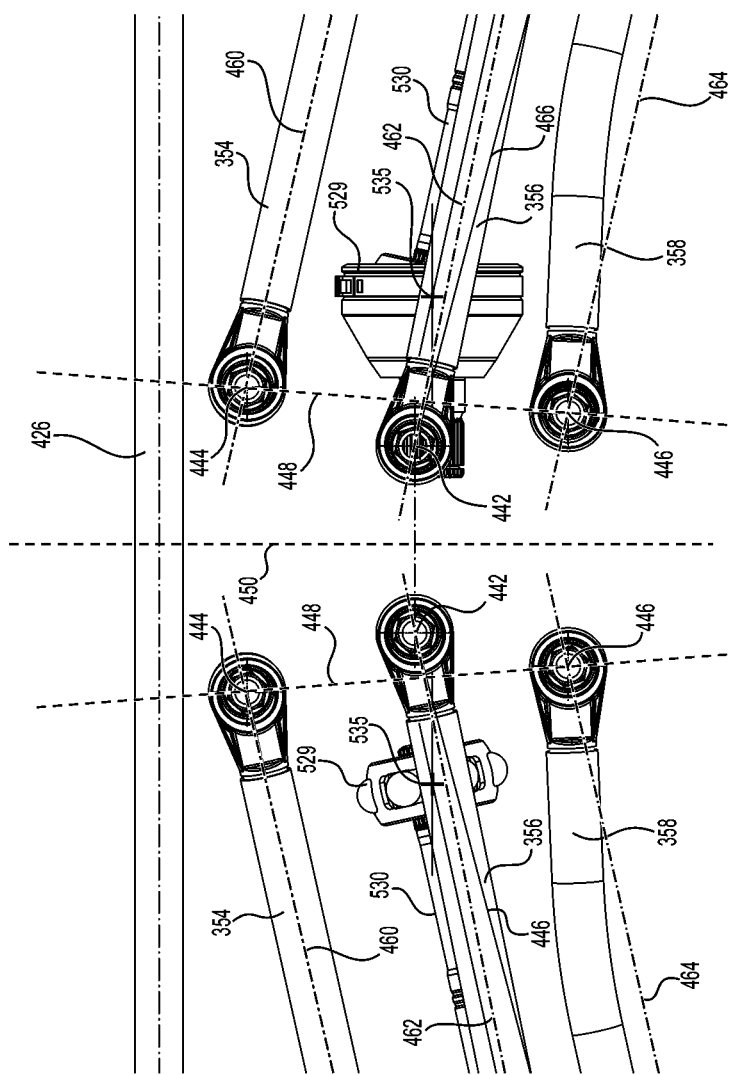
FIG. 25B is a close-up view of the laterally inward connections of the rear suspension assemblies of FIG. 25A.

As best seen in FIG. 24B, from their connections with the rear portion 104 of the frame 12, the links 354, 356, 358 extend forward as they extend toward the knuckle 360. The links 354, 356, 358 are disposed rearward of the wheel rotation axis 364. The toe link 356 is disposed rearward of the upper and lower links 354, 358. As best seen in FIG. 25B, the laterally inward connection point 442 of the toe link 356 is disposed laterally inward of the laterally inward connection points 444, 446 of the upper and lower links 354, 358. The connection point 442 is also laterally between a line 448 passing through the connection points 444, 446 and a longitudinally and vertically extending center plane 450 of the vehicle 10. As can be seen in FIG. 25A, the laterally outward connection point 452 of the toe link 356 is disposed laterally outward of the laterally outward connection points 454, 456 of the upper and lower links 354, 358. The connection point 452 is also laterally between a line 458 passing through the connection points 454, 456 and a longitudinally and the corresponding brake disk 365.

As can be seen in FIG. 24B, when viewed from above, a line 460 passing through the connection points 444, 454 of the upper link 354 is skewed relative to a line 462 passing through the connection points 442, 452 of the toe link 356 and to a line 464 (hidden in FIG. 24B) passing through the connection points 446, 456 of the lower link 358. As can be seen in FIGS. 25A and 25B, when viewed from behind, with rear suspension 20 in a position where the line 458 passing through the laterally outward connection points 454, 456 is vertical (i.e. as shown in FIGS. 25A, 25B), the lines 460 and 464 are parallel to each other, but the line 462 is skewed relative to the lines 460, 464. The relative angle between the lines 460 and 464 varies by less than 1 degree throughout a full range of travel of the rear suspension assembly 20, as such the lines 460 and 464 are considered substantially parallel for all positions of the rear suspension assembly 20. As can be seen in FIG. 24B, the line 462 passing through the connection points 442, 452 of the toe link 356 extends through a circle defined by a perimeter of it corresponding brake disk 365.

The shock absorber assembly 352 includes a coil spring disposed around a hydraulic shock, and the hydraulic shock has a separate reservoir connected to it. Since shock absorber assemblies of this type are well known, the shock absorber assembly 352 will not be described in greater detail. The lower end of the shock absorber assembly 352 is pivotally connected to the trailing arm 350 by a ball joint (not shown) about a pivot axis 412 (FIG. 26) via the bracket 384. From the bracket 384, the shock absorber assembly 352 extends upward, forward and laterally inward. As can be seen in FIG. 23, the upper end of the shock absorber assembly 352 is pivotally connected to the bracket 154 of the central portion 100 of the frame 12 via a ball joint (not shown) about a pivot axis 414 (FIG. 26). As can be seen in FIG. 23, the upper portion of the shock absorber assembly 352 is disposed laterally inward of the leg 172 and the member 222 of the frame 12. The engine 30 is disposed laterally between the left and right shock absorber assemblies 352. As can be seen in FIG. 21 for the left rear suspension assembly 20, when the shock absorber assembly 352 of the rear suspension assembly 20 is fully compressed, the center of the corresponding rear wheel 18 and the lower end of the shock absorber assembly 352 are disposed vertically higher than the H-point 292 of the driver sitting in the driver seat 24 with the driver seat 24 in its rearmost position.

As the rear suspension assembly 20 travels up and down during operation of the vehicle 10, the trailing arm 350 and the toe link 356 pivot about an instant center axis 466 of the rear suspension assembly 20. As can be seen in FIGS. 24A and 24B, the instant center axis 466 is the axis passing through a center of the ball joint 369 at the front of the trailing arm 350 and the center of the ball joint at the laterally inward end of the toe link 356 (i.e. the connection point 442).

As can be seen in FIG. 26 for the passenger seat 26 and the right rear suspension assembly 20, the axis 366 of the trailing arm 350 and the pivot axis 414 of the shock absorber assembly 352 are positioned such that the lateral center portion of the seat back 416 of the passenger seat 26 has a forwardmost point 418 disposed rearward of the axis 366 and a rearmost point 420 disposed forward of the pivot axis 414 when the passenger seat 26 is in its rearmost position as shown. The same is true for the driver seat 24 with respect to the left suspension assembly 20.

As best seen in FIG. 24A, the left and right trailing arms 350 are each pivotally connected to links 422. Each link 422 is connected by a ball joint (not shown) to its corresponding trailing arm 350 by the plate 382 and the bracket 384 between which its lower end is received. The links 422 extend upward and pivotally connect via ball joints to opposite ends of a torsion bar 426. The torsion bar 426 is connected via two pillow blocks 424 to the members 210 of the rear portion 104 of the frame 12 as can be seen in FIG. 5.

Figure 22:
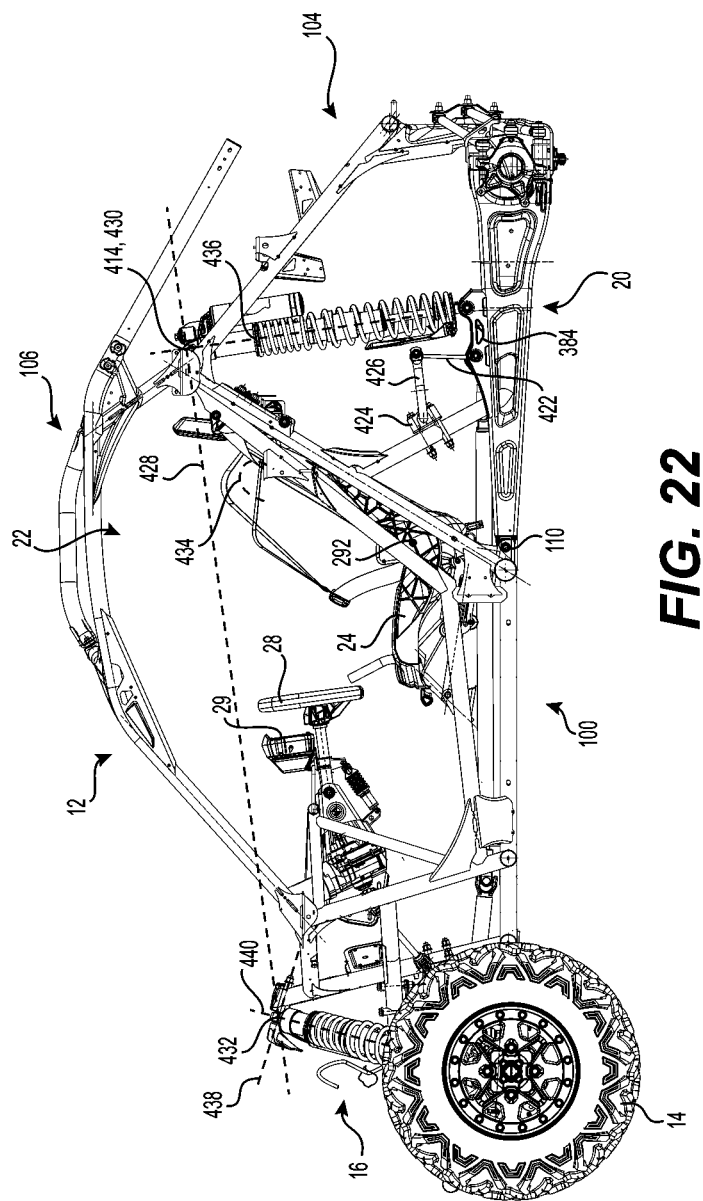
FIG. 22 is a left side elevation view of the frame, seats, steering assembly, front wheels, front suspension assemblies, rear suspension assemblies and other components of the vehicle of FIG. 1, with the front and rear suspension assemblies being in a position corresponding to the vehicle being unloaded and on level ground.

As can be seen in FIG. 22, a line 428 passing through points 430 and 432 is disposed above the shoulder (generally indicated by curve 434) of a driver of the vehicle 10 sitting in the driver seat 24 in its rearmost position as shown with his back firmly against the seat back 416. The curve 434 contains the shoulder reference point as defined in SAE J826 (as revised in November 2008). The point 430 is the point at the intersection of the pivot axis 414 of the rear shock absorber assembly 352 and the centerline 436 of the shock absorber of the rear shock absorber assembly 352. The point 432 is the point at the intersection of the upper pivot axis 438 of the front shock absorber assembly 254 and the centerline 440 of the shock absorber of the front shock absorber assembly 254.

Turning now to FIGS. 5 and 28 to 35, the powertrain of the vehicle 10 will be described. The engine 30 is connected to the frame 12 behind the line 370 (FIG. 26) passing through the rearmost point of the seat bottom 368. More specifically, the engine 30 has two engine mounts 500, 502 (FIG. 31) on a lower portion thereof that are connected to the brackets 214, 216 respectively (FIG. 13) of the rear portion 104 of the frame 12. The engine 30 is an in-line, three-cylinder, four-stroke internal combustion engine. It is contemplated that other types of internal combustion engines could be use, such as a V-twin or a two-stroke internal combustion engine for example. It is also contemplated that in some implementations, the engine 30 could be replaced by another type of motor such as a diesel engine or an electric motor for example.

The transaxle 34 is mounted to the back of the engine 30. The transaxle 34 is mechanically connected to a shifter 504 (FIG. 35). The shifter 504 is disposed laterally between the two seats 24, 26. The shifter 504 allows the driver to select from a plurality of combinations of engagement of gears of the transaxle 34, commonly referred to as gears. In the present implementation, the shifter 504 allows the driver to select a reverse gear, two forward gears (high and low) and a neutral position in which the transaxle 34 does not transmit torque to the wheels 14, 18. It is contemplated that other types of connections between the shifter 504 and the transaxle 34 could be used. It is also contemplated that the transaxle 34 could select between transferring torque to only two of the wheels 14 or 18 and all four wheels 14, 18, in which case a two-wheel drive, four-wheel drive selector would be provided in the vicinity of the driver.

The CVT 32 is mounted on the left side of the engine 30 and of the transaxle 34. The CVT 32 has a CVT housing 506 (FIGS. 32 to 34) inside which are located a primary pulley 508, a secondary pulley 510 and a belt 512 (schematically shown in FIG. 29). In order to cool the CVT 32, the CVT housing 506 is provided with two inlet pipes 514 to supply air inside the CVT housing 506 and two outlet pipes 516 to exhaust air from the CVT housing 506. The inlets of the inlet pipes 514 are connected to the bottom of an air box 515, a cover of which has been removed to show internal features thereof. The outlets of the outlet pipes 516 are open to the atmosphere. The primary pulley 508 is mounted on and driven by the output shaft 518 of the engine 30 (schematically shown in FIG. 29) which protrudes from the left side of the engine 30. In the present implementation, the output shaft 518 is the crankshaft of the engine 30, but it is contemplated that it could be a separate shaft driven by crankshaft. The secondary pulley 510 is mounted on and drives the input shaft 520 of the transaxle 34 (schematically shown in FIG. 29) which protrudes from the left side of the transaxle 34. It is contemplated that the CVT 32 could be mounted on the right side of the engine 30 and of the trans axle 34, in which case the shafts 518 and 520 would protrude from the right side of the engine 30 and transaxle 34 respectively. The belt 512 is wrapped around the primary and secondary pulleys 508, 510 to transfer torque from the primary pulley 508 to the secondary pulley 510. As a result, the engine 30 drives the CVT 32 which drives the transaxle 34.

Figure 29:
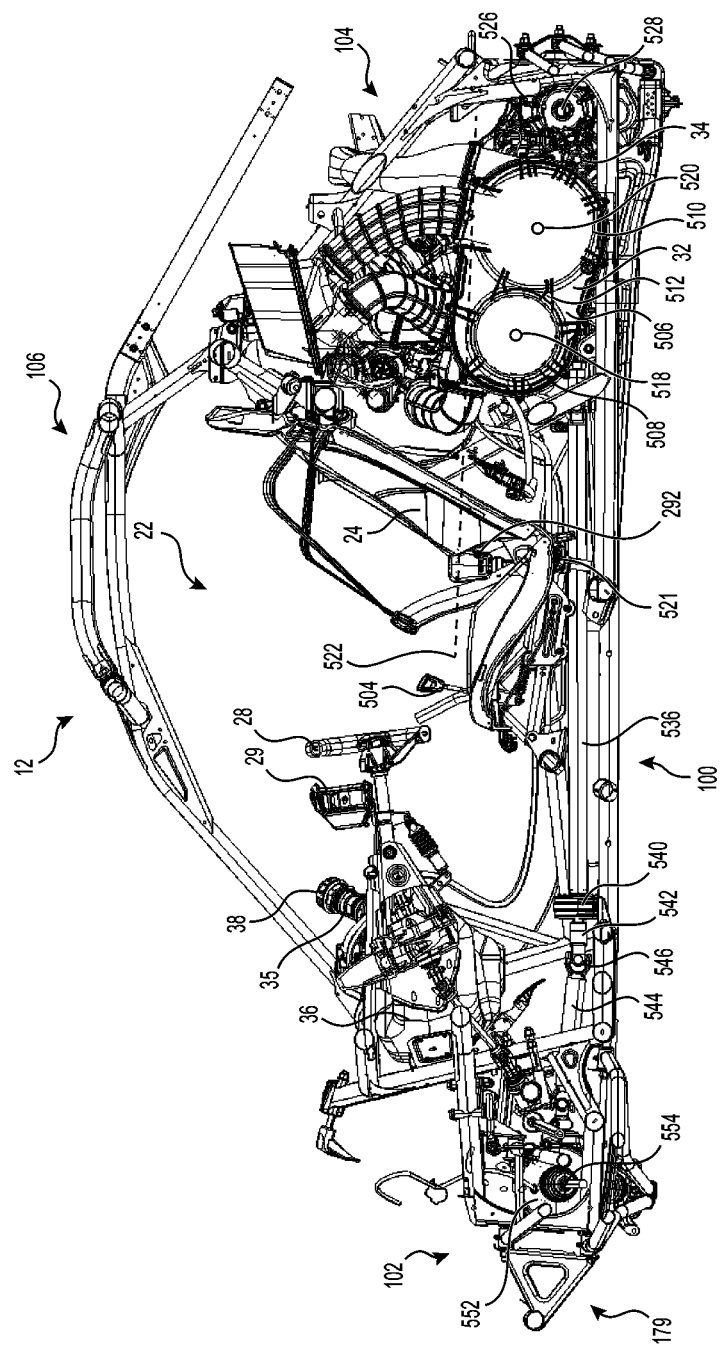
FIG. 29 is a partial cross-sectional view of the frame, seats and powertrain of the vehicle of FIG. 1.

As can be seen in FIG. 29, the output shaft 518 of the engine 30 and the input shaft 520 of the transaxle 34 are vertically higher than the lowest point 521 of the seat bottom 368 the driver seat 24 when the seat 24 is in its rearmost position as shown, with the vehicle 10 in an unloaded state, on flat, horizontal ground. As can also be seen in FIG. 29, a line 522 passing through the highest points of the primary and secondary pulleys 508, 510 passes vertically above the H-point 292 of the driver sitting in the driver seat 24 with the driver seat 24 in its rearmost position.

Figure 28:
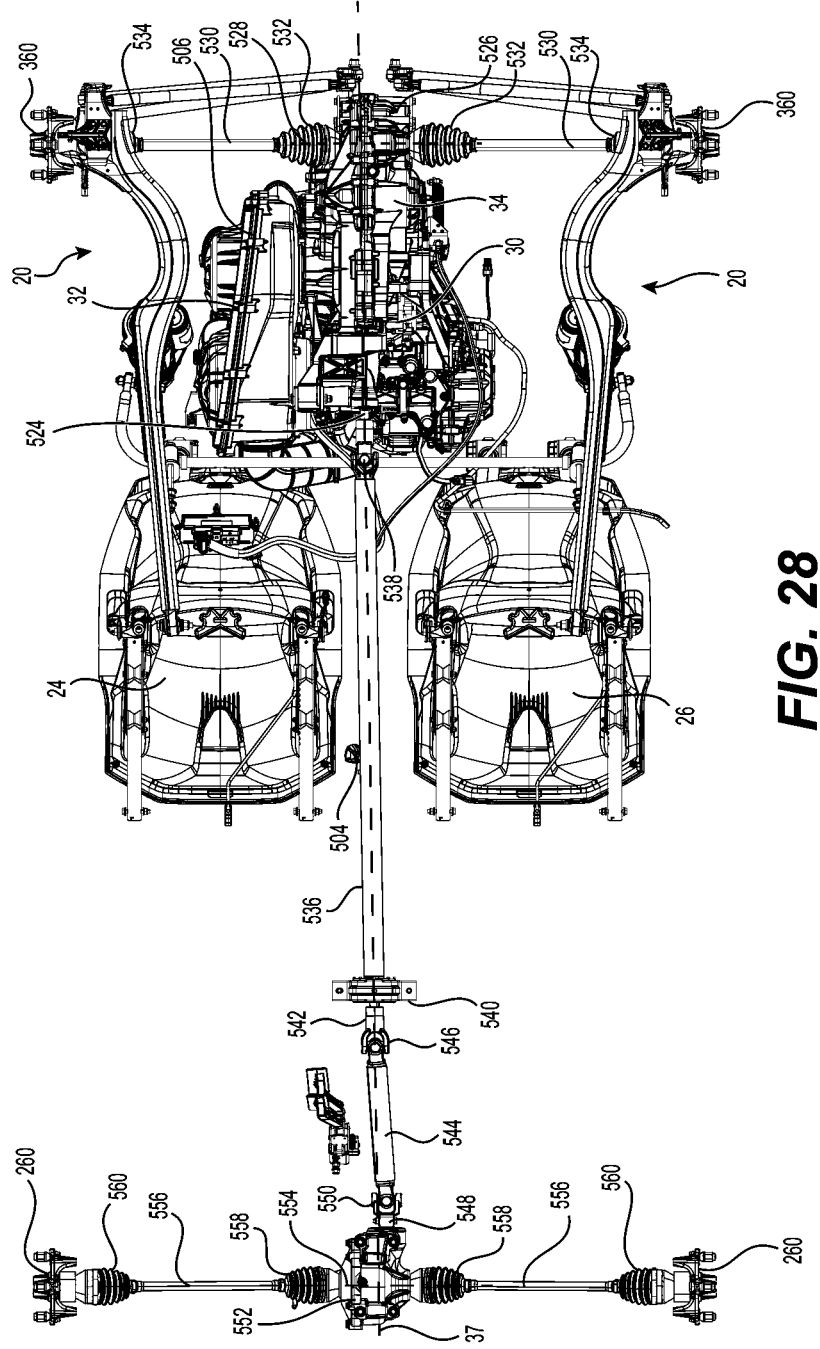
FIG. 28 is a bottom plan view of portions of the frame, the rear suspension assemblies, the seats and the powertrain of the vehicle of FIG. 1.
Figure 31:
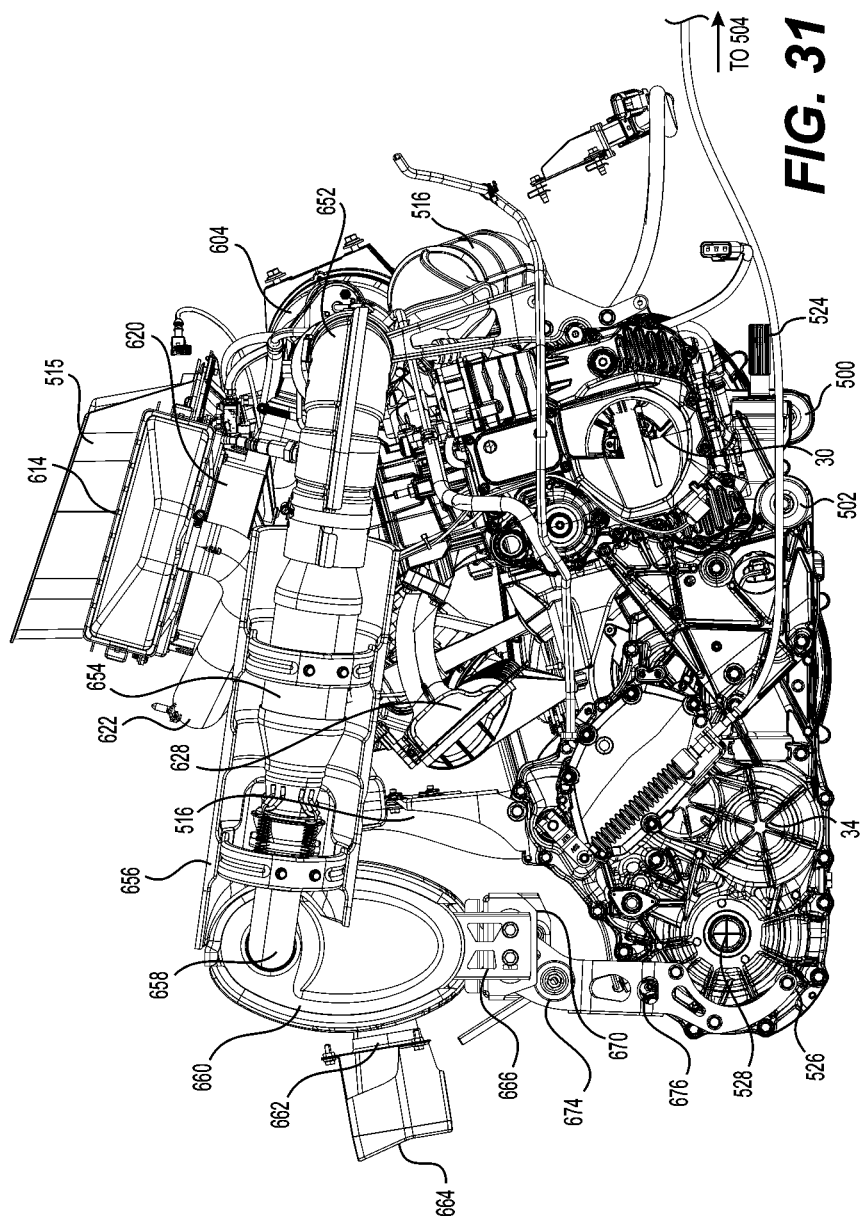
FIG. 31 is a right side elevation view of the engine, air intake system and exhaust system of the vehicle of FIG. 1.
Figure 32:
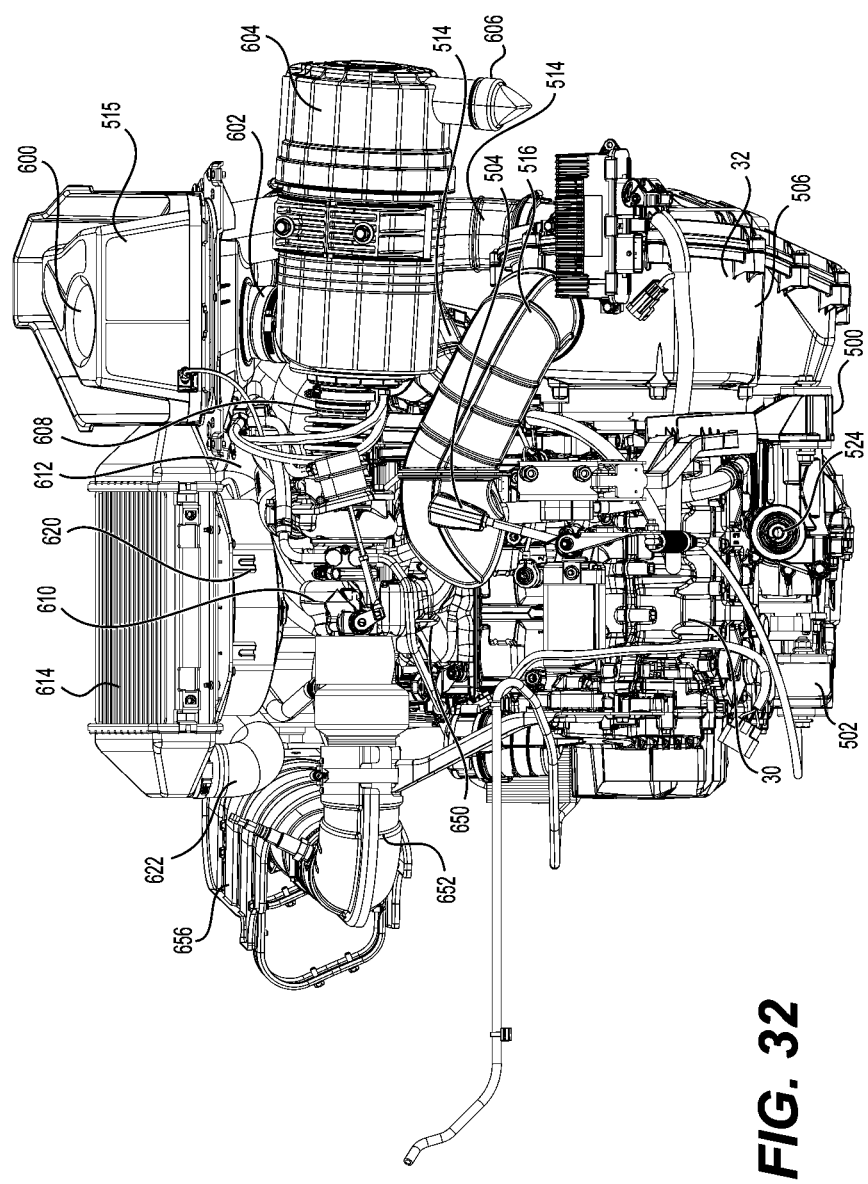
FIG. 32 is a front elevation view of the components of FIG. 31.

The transaxle 34 has a plurality of gear trains connected and driving a front output shaft 524 (FIG. 31). The transaxle 34 incorporates a rear differential 526 that is driven by the plurality of gear trains. The driven output gears (not shown) of the rear differential 526 rotate about a laterally extending rear differential axis 528 (FIG. 31). The driven output gears of the rear differential 526 are operatively connected to and drive left and right rear half-shafts 530 via constant velocity (CV) joints 531 (shown in FIGS. 24A to 25B), also known as homokinetic joints, located inside flexible covers 532. From the rear differential 526, the rear half-shafts 530 extend downward (when the rear suspension assemblies 20 are in the position shown in FIG. 24A) and laterally outward. The laterally outward ends of the rear half-shafts 530 are operatively connected to and drive the rear wheel axles (not shown) via universal joints (not shown) located inside flexible covers 534 (FIG. 23). The rear wheel axles extend through the knuckles 360 and connect to the rear wheel hubs 362 which in turn drive the rear wheels 18. As can be seen in FIGS. 24B and 28, the upper, toe, and lower links 354, 356, 358 are located completely behind the half-shafts 530 and the rear differential axis 528.

In order to reduce plunging of the half-shafts 530 in and out of the CV joints 531 as the rear suspensions assemblies 20 travel up and down, the CV joints 531 are disposed in proximity to the instant center axes 466 of the rear suspension assemblies 20. As can be seen in FIGS. 24B and 25B, the centers 535 of the CV joints 531 are located slightly laterally outward (FIG. 24B) and vertically above (FIG. 25B) of the instant center axes 466. As best seen in FIG. 25B, the centers 535 of the CV joints 531 are disposed laterally outward of the lines 448 passing through the connections points 444, 446 of the upper and lower links 354, 358. Also, the centers of the CV joints 531 are vertically lower than the connection points 444, 442 of the upper and toe links 354, 356 and vertically higher than the connections points 446 of the lower links 358.

As can be seen in FIG. 28, the front output shaft 524 of the transaxle 34 is disposed to the right of the longitudinal centerline 37 of the vehicle 10. The front output shaft 524 is operatively connected to and drives a driveshaft 536 via a universal joint 538. From the universal joint 538, the driveshaft 536 extends forward and toward the left. The front end of the driveshaft 536 is connected to a sleeve (not shown) supported inside a bearing assembly 540 mounted to the bracket 120 (FIG. 7). Another driveshaft 542 disposed in front of the bearing assembly 540 and coaxially with the driveshaft 536 is connected via splines to the driveshaft 536. The front end of the driveshaft 542 is operatively connected to and drives another driveshaft 544 via a universal joint 546. From the universal joint 546, the driveshaft 544 extends forward, upward and to the left. The front end of the driveshaft 544 is operatively connected to and drives a front differential input shaft 548 via a universal joint 550. The front differential input shaft 548 is parallel to the longitudinal centerline 37 and is disposed to the left thereof.

Figure 30:
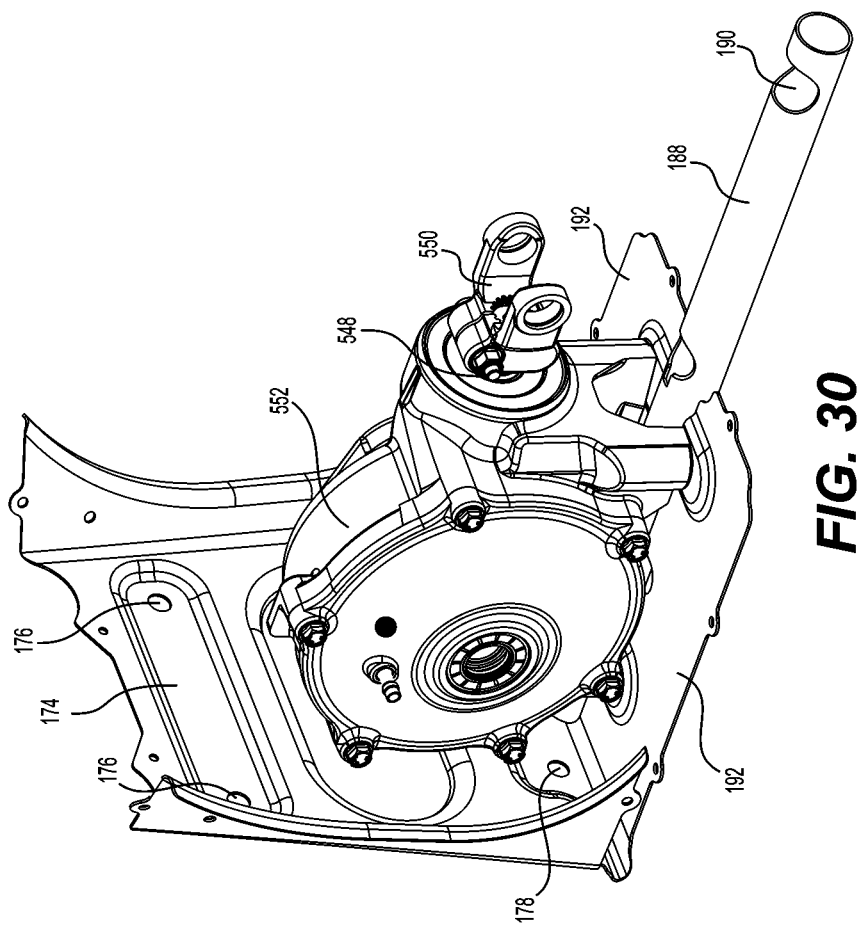
FIG. 30 is a perspective view taken from a rear, left side of a front differential of the powertrain of the vehicle of FIG. 1.

The front differential input shaft 548 drives a front differential 552. As best seen in FIG. 30, the front differential 552 is mounted to the top of the plates 192 and straddles the member 188 of the front portion 102 of the frame 12. Fasteners (not shown) are inserted through the bottom of the plates 192 into the front differential 552 to secure the front differential 552 to the plates 192. The bottom of the front differential 552 is received within the perimeter defined by the bracket 174, the members 180 and the member 182 of the front portion 102 of the frame 12 (FIG. 10).

The driven output gears (not shown) of the front differential 552 rotate about a laterally extending front differential axis 554 (FIGS. 28, 29). The driven output gears of the front differential 552 are operatively connected to and drive left and right front half-shafts 556 via universal joints (not shown) located inside flexible covers 558. From the front differential 552, the front half-shafts 556 extend downward (when the front suspension assemblies 16 are in the position shown in FIG. 16) and laterally outward. The laterally outward ends of the front half-shafts 556 are operatively connected to and drive the front wheel axles (not shown) via universal joints (not shown) located inside flexible covers 560. The front wheel axles extend through the kingpins 256 and connect to the front wheel hubs 260 which in turn drive the front wheels 14.

Turning now to FIGS. 31 to 36, the air intake system and the exhaust system of the vehicle 10 will be described.

The air intake system has an upwardly facing air inlet 600 located in the air box 515 above a front, left portion of the engine 30. From the air inlet 600, air flows into an air intake pipe 602 which extends downward, forward and to the right and enters through a top portion of an airbox 604 near a right end thereof. The airbox 604 is generally cylindrical and contains an air filter (not shown). From its right end, the airbox 604 extends downward, forward and to the left. The airbox 604 is provided with a drain 606 at a lower left corner thereof, which is the lower portion of the airbox 604, to permit any water that may have accumulated in the airbox 604 to be drained from the airbox 604.

From the airbox 604, air enters an air pipe 608 that extends generally to the right from the right end wall of the airbox 604 and enters a turbocharger 610. The turbocharger 610 is disposed in front of the cylinders of the engine 30 and generally laterally centered relative to the engine 30. From the turbocharger 610, air enters an air pipe 612 that connects to a left side of an intercooler 614.

The intercooler 614 includes passages for the flow of air coming from the air pipe 612 for cooling the air that has previously been heated in the turbocharger 610. The intercooler 614 is disposed at an angle laterally between the seats 24, 26. A fan 620 is provided under the intercooler 614 to generate an air flow through the intercooler 614 at least when the vehicle 10 is stationary.

From the intercooler 614, air flows downward and rearward in an air pipe 622 (FIG. 33) disposed on a right side of the engine 30. From the air pipe 622, air enters a throttle body 624 (FIG. 34) which includes a throttle valve (not shown) to control the flow of air to the engine 30. The position of the throttle valve is determined at least in part by the position of the throttle pedal 626 (FIG. 5) disposed in front of the driver seat 24. From the throttle body 624, the air enters a plenum 628 extending laterally behind the cylinders of the engine 30. From the plenum 628, the air is supplied to the combustion chambers of the engine 30.

Exhaust gases from the combustion chambers of the engine 30 enter the exhaust system via an exhaust manifold 650 (FIG. 32) connected to the front of the cylinders of the engine 30. From the exhaust manifold 650, the exhaust gases flow to the turbocharger 610 to drive the turbine of the turbocharger 610. From the turbocharger 610, the exhaust gases flow in an exhaust pipe 652 that first extends to the right and then rearward. From the exhaust pipe 652, the exhaust gases flow rearward and downward through an expansion chamber 654. It is contemplated that the expansion chamber 654 could house a catalytic converter. The expansion chamber 654 is disposed inside a container 656, a portion of which is removed in the figures to show the expansion chamber 654. From the expansion chamber 654, the exhaust gases flow in an exhaust pipe 658 that first extends rearward and then left into a muffler 660. From the muffler 660, the exhaust flows in an exhaust pipe 662 extending from the rear side of the muffler 660. The exhaust pipe 662 is laterally centered on the vehicle 10. The exhaust pipe 662 defines the rearward facing exhaust outlet 664 through which the exhaust gases flow to the atmosphere.

Figure 33:
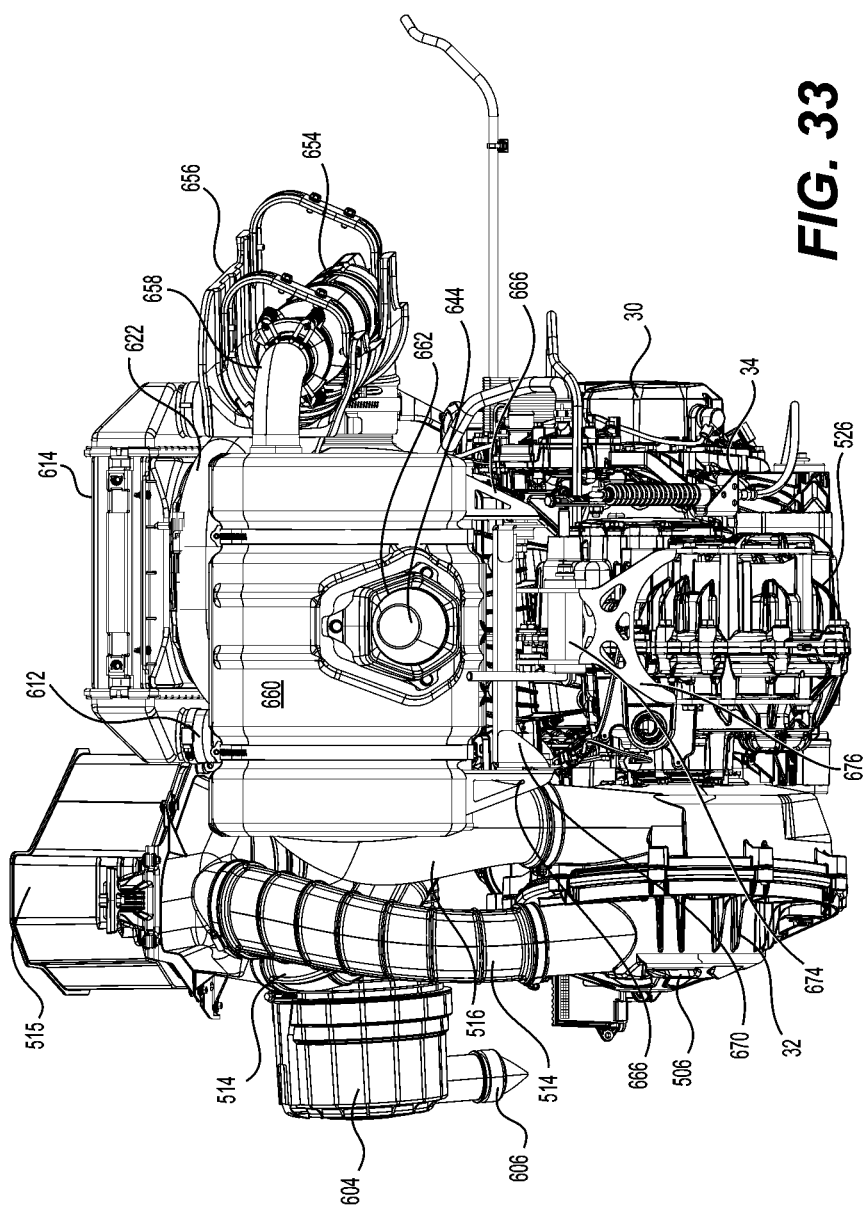
FIG. 33 is a rear elevation view of the components of FIG. 31.
Figure 34:
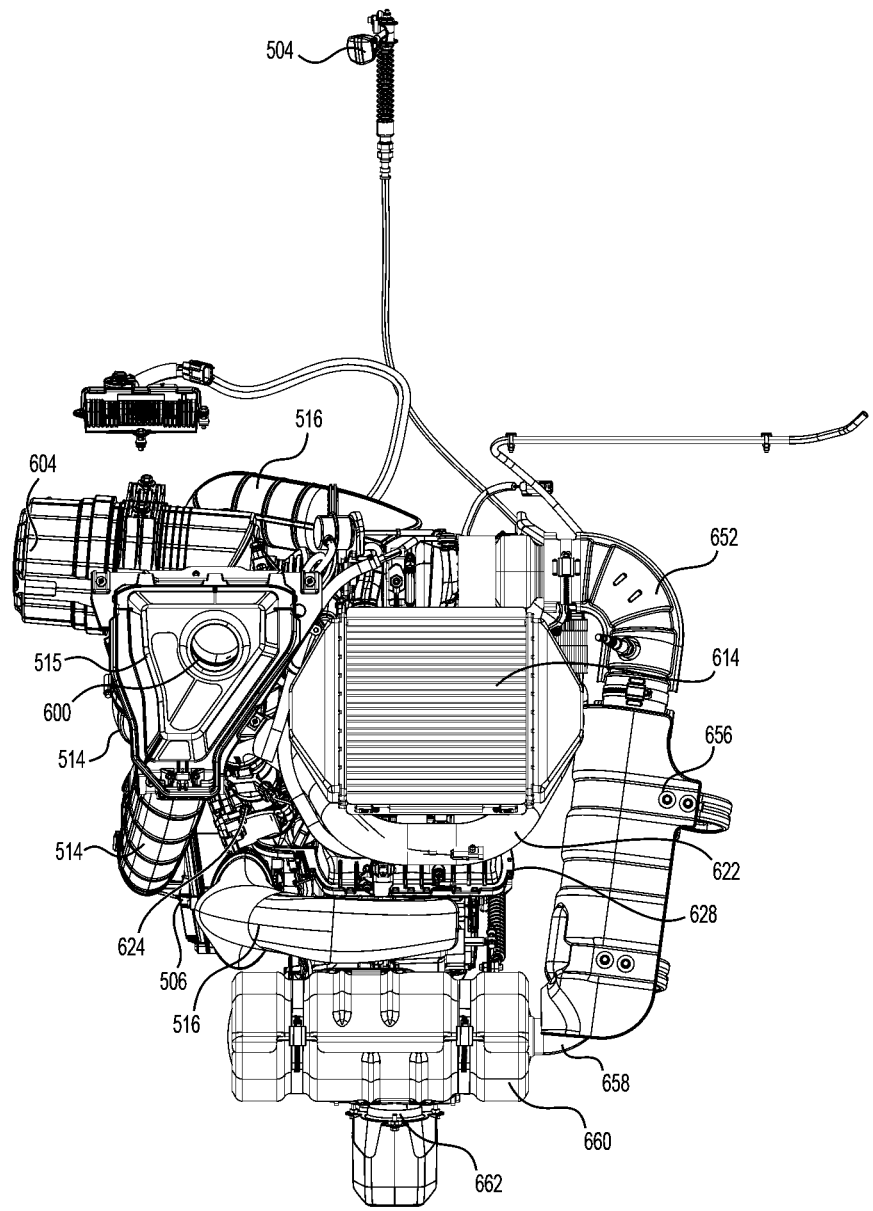
FIG. 34 is a top plan view of the components of FIG. 31.

The muffler 660 is generally shaped like a cylindroid having closed ends. As best seen in FIGS. 31 and 33, the muffler 660 is connected via two arms 666 to a bracket 670 disposed below the muffler 660. Vibration dampers (not shown) are provided between the arms 666 and the bracket 670. The bracket 670 is connected to a vibration damper 674 and the vibration damper 674 is connected to a bracket 676 having a pair of arms. The arms of the bracket 676 are connected to either sides of the portion of the transaxle 34 containing the rear differential 526 rearward of the axis 528. As can be seen in FIG. 5, a radiator 616 is connected to the front portion of the frame 102 and the bumper frame assembly 179. The radiator 616 is used to cool engine coolant used to cool the engine 30.

Turning now to FIGS. 5, 19, 37 and 38 the steering assembly of the vehicle 10 will be described. The steering assembly has the steering wheel 28 disposed in front of the driver seat 24. The steering wheel 28 is connected via a steering wheel position adjustment mechanism 700 to the steering wheel support frame structure 138. The steering wheel position adjustment mechanism 700 allows the steering wheel 28 to be pivoted about a laterally extending horizontal axis such that the height and orientation of the steering wheel 28 can be adjusted.

The steering wheel 28 is connected by an assembly of shafts and universal joints 702 (FIG. 37) to an input shaft 704 (FIG. 19) of an electric motor and gear box assembly 706. The electric motor and gear box assembly 706 applies torque to assist in steering the vehicle 10. The amount of torque applied by the electric motor and gear box assembly 706 varies depending on the operating conditions of the vehicle 10. As such, the steering assembly of the vehicle 10 has what is commonly referred to as a power steering system.

An output shaft 708 (FIG. 38) of the electric motor and gear box assembly 706 is connected via a shaft 710 and a pair of universal joints 712 to an input shaft 714 of a rack and pinion assembly 716. As can be seen in the figures, the rack and pinion assembly 716 is located rearward of the front shock absorber assemblies 254 and the front differential 552, and below the laterally extending portion of the sway bar 298. The pinion (not shown) of the rack and pinion assembly 716 is connected to the forward end of the input shaft 714 of the rack and pinion assembly 716. As would be understood from the position of the input shaft 714 (see FIG. 19), the pinion is disposed to the left of the longitudinal centerline 37 of the vehicle 10.

Two steering rods 718 are connected by ball joints to the front of the rack and pinion assembly 716. The laterally outward ends of the steering rods 718 are connected by ball joints to tabs 720 at the rear of the kingpins 256. As a result of turning the steering wheel 28, the rack and pinion assembly 716 moves the steering rods 718 left or right, which rotates the kingpins 256, and therefore the front wheels 14, about their steering axes 258, thereby steering the vehicle 10 in the direction corresponding to the direction of rotation of the steering wheel 28.

Figure 39:
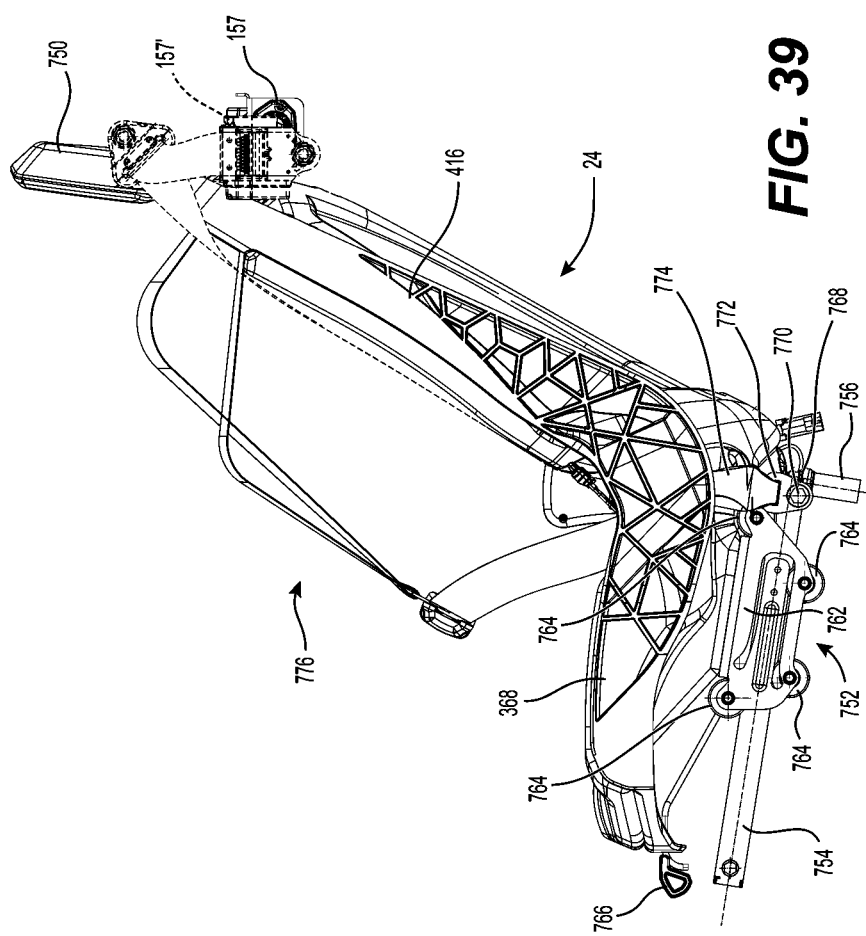
FIG. 39 is a left side elevation view of a driver seat of the vehicle of FIG. 1 with a left side portion of the seat bottom of the driver seat removed.
Figure 40:
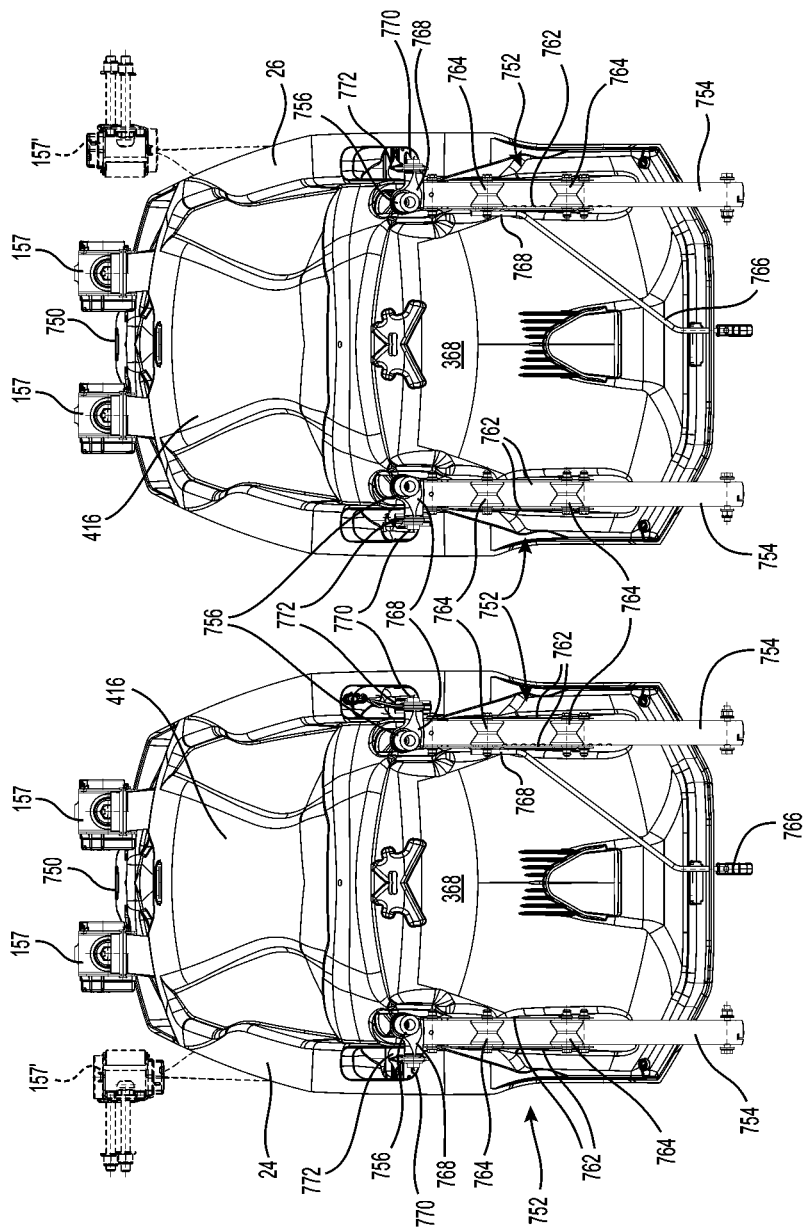
FIG. 40 is a bottom plan view of the seats of the vehicle of FIG. 1.

Turning now to FIGS. 39 to 41, the driver and passenger seats 24, 26 will be described in more detail. As previously mentioned, each of the seats 24, 26 has a seat bottom 368 and a seat back 416. Each of the seats 24, 26 also has a head rest 750 disposed above the seat back 416. Each of the seats 24, 26 is made of a plastic shell to which cushions are mounted.

Two roller assemblies 752 are connected to the bottom of each seat 24, 26. The roller assemblies 752 are mounted on rails 754. The rails 754 are mounted at their front ends to the brackets 158 (see FIG. 7) of the central portion 100 of the frame 12. From their front ends, the rails 754 extend rearward and downward and connect at their rear ends to pins 756. The pins 756 are connected to the brackets 111 (FIG. 36).

Each roller assembly 752 has a pair of plates 762 between which four rollers 764 are held. Each roller assembly 752 is mounted to its corresponding rail 754 such that the rail 754 is received laterally between the plates 762, with two of the rollers 764 on top of the rail 754 and two of the rollers 764 under the rail 754. As such, the roller assemblies 752 allow the seats 24, 26 to be moved independently from each other along the rails 754 between various positions. Since the rails 754 are angled, as the seats 24, 26 are moved forward, they also move upward as can be seen by comparing the positions of the seat 24 in FIG. 39 to FIG. 41.

In order to maintain the seats 24 and 26 in position, the right roller assembly 752 of each of the seats 24, 26 is provided with a laterally biased arm 766 (see FIG. 40) that protrudes from a front of its corresponding seat 24, 26. To set a position of its corresponding seat 24 or 26, the arm 766 pushed left to disengage a pin (not shown, but on portion 768) on the arm 766 from a dimple (not shown) in the left side of the right rail 754, the seat 24 or 26 is moved on the rails 754 to a desired position, and the arm 766 is released such that the pin on the arm 766 is inserted with one of a plurality of holes (not shown) in the right rail 754 with which it is aligned.

The pins 756 are connected to rails 754 via a metal casting 768. The casting 768 provides an aperture (not shown) to receive the pins 756 and a laterally extending aperture (not shown) to receive a fastener 770. The fastener 770 fastens a clip 772 to the casting 768. The clip 772 is used to fasten the end of a lap belt portion 774 of the seat belt 776 of the seat 24 (or 26).

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A vehicle comprising:
   a frame;
   a driver seat connected to the frame;
   a passenger seat connected to the frame, the passenger seat being disposed beside the driver seat;
   a front left suspension assembly connected to the frame;
   a front left wheel operatively connected to the front left suspension assembly;
   a front right suspension assembly connected to the frame;
   a front right wheel operatively connected to the front right suspension assembly;
   a rear left suspension assembly connected to the frame;
   a rear left wheel operatively connected to the rear left suspension assembly;
   a rear right suspension assembly connected to the frame;
   a rear right wheel operatively connected to the rear right suspension assembly;
   a rear differential operatively connected to the rear left wheel and the rear right wheel, the rear differential defining a laterally extending rear differential axis; and
   a motor operatively connected to the rear differential, the motor driving the right rear wheel and the left rear wheel via the rear differential;
   each of the rear left suspension assembly and the rear right suspension assembly comprising:
      a trailing arm having a front end pivotally connected to the frame;
      a knuckle pivotally connected to a rear portion of the trailing arm;
      a lower link having a laterally outward end pivotally connected to the trailing arm and a laterally inward end pivotally connected to the frame;
      an upper link having a laterally outward end pivotally connected to the trailing arm and a laterally inward end pivotally connected to the frame; and
      a toe link having a laterally outward end pivotally connected to the knuckle and a laterally inward end pivotally connected to the frame,
      the lower link, the upper link and the toe link being disposed completely behind the rear differential axis.

2. The vehicle of claim 1, further comprising:
   a rear left hub rotationally connecting the rear left wheel to the knuckle of the rear left suspension assembly;
   a left half-shaft operatively connecting the rear left hub to the rear differential;
   a rear right hub rotationally connecting the rear right wheel to the knuckle of the rear right suspension assembly;
   a right half-shaft operatively connecting the rear right hub to the rear differential;
   wherein the lower links, the upper links and the toe links are disposed completely behind the left and right half-shafts.

3. The vehicle of claim 1, wherein for each of the rear left suspension assembly and the rear right suspension assembly the toe link is vertically between the lower link and the upper link.

4. The vehicle of claim 1, wherein each of the rear left suspension assembly and the rear right suspension assembly further comprises:
   an upper ball joint pivotally connecting the knuckle to the trailing arm, the upper ball joint being vertically higher than a wheel rotation axis of a corresponding one of the left rear wheel and the right rear wheel; and
   a lower ball joint pivotally connecting the knuckle to the trailing arm, the lower ball joint being vertically lower than the wheel rotation axis.

5. The vehicle of claim 1, wherein for each of the rear left suspension assembly and the rear right suspension assembly:
   the lower link is parallel to the upper link when a line passing through a lower connection point and an upper connection point is vertical;
   the lower connection point is a connection point of the laterally outward end of the lower link with the trailing arm; and
   the upper connection point is a connection point of the laterally outward end of the upper link with the trailing arm.

6. The vehicle of claim 1, wherein for each of the rear left suspension assembly and the rear right suspension assembly:
   a projection of a first line passing through connection points of the lower link with the trailing arm and the frame onto a horizontal plane is skewed relative to a projection of a second line passing through connection points of the toe link with the knuckle and the frame onto the horizontal plane;
   the projection of the second line is skewed relative to a projection of a third line passing through connection points of the upper link with the trailing arm and the frame onto the horizontal plane; and
   the projection of the third line is skewed relative to the projection of the first line.

7. The vehicle of claim 1, wherein for each of the rear left suspension assembly and the rear right suspension assembly:
   a projection of a first line passing through connection points of the lower link with the trailing arm and the frame onto a laterally extending vertical plane is skewed relative to a projection of a second line passing through connection points of the toe link with the knuckle and the frame onto the vertical plane; and
   the projection of the second line is skewed relative to a projection of a third line passing through connection points of the upper link with the trailing arm and the frame onto the vertical plane.

8. The vehicle of claim 1, wherein for each of the rear left suspension assembly and the rear right suspension assembly a connection point of the laterally outward end of the toe link with the knuckle is laterally outward of connection points of the laterally outward ends of the upper and lower links with the trailing arm.

9. The vehicle of claim 1, wherein for each of the rear left suspension assembly and the rear right suspension assembly a connection point of the laterally inward end of the toe link with the frame is laterally inward of connection points of the laterally inward ends of the upper and lower links with the frame.

10. The vehicle of claim 1, wherein for each of the rear left suspension assembly and the rear right suspension assembly a connection point of the laterally outward end of the toe link with the knuckle is longitudinally rearward of connection points of the laterally outward ends of the upper and lower links with the trailing arm.

11. The vehicle of claim 1, further comprising:
a rear left hub rotationally connecting the rear left wheel to the knuckle of the rear left suspension assembly;
a rear left brake disk connected to the rear left hub;
a rear right hub rotationally connecting the rear right wheel to the knuckle of the rear right suspension assembly; and
a rear right brake disk connected to the rear right hub;
wherein for each of the rear left suspension assembly and the rear right suspension assembly a line passing through connection points of the toe link with the knuckle and the frame extends through a circle defined by a perimeter of a corresponding one of the rear left and rear right brake disk.

12. The vehicle of claim 1, wherein for each of the rear left suspension assembly and the rear right suspension assembly:
the laterally outward end of the lower link is pivotally connected to the knuckle; and
the laterally outward end of the upper link is pivotally connected to the knuckle.

13. The vehicle of claim 1, wherein for each of the rear left suspension assembly and the rear right suspension assembly:
the laterally outward end of the lower link is behind the knuckle;
the laterally outward end of the upper link is behind the knuckle; and
the laterally outward end of the toe link is behind the knuckle.

14. The vehicle of claim 1, wherein each of the rear left suspension assembly and the rear right suspension assembly further comprises a shock absorber assembly having a lower end pivotally connected to the trailing arm and an upper end pivotally connected to the frame.

15. The vehicle of claim 14, further comprising a torsion bar pivotally connected between the trailing arms.

* * * * *